United States Patent [19]

Pires

[11] Patent Number: 4,983,151
[45] Date of Patent: Jan. 8, 1991

[54] TRANSMISSION RATIO CHANGING APPARATUS AND METHOD

[75] Inventor: Paul B. Pires, Ben Lomond, Calif.

[73] Assignee: Epilogics, Inc., Los Gatos, Calif.

[21] Appl. No.: 359,024

[22] Filed: May 30, 1989

Related U.S. Application Data

[63] Continuation-in-part of Ser. No. 232,472, Aug. 15, 1988, abandoned.

[51] Int. Cl.[5] .................................... F16H 3/44
[52] U.S. Cl. .......................... 475/170; 475/296
[58] Field of Search ............... 74/117, 122, 123, 124, 74/125, 679, 793; 475/169, 170, 269, 296, 302

[56] References Cited

U.S. PATENT DOCUMENTS

| | | | |
|---|---|---|---|
| 1,660,356 | 2/1928 | Postel . | |
| 2,547,453 | 4/1951 | Egy | 74/679 |
| 2,655,819 | 10/1953 | Posson | 74/679 |
| 2,864,259 | 12/1958 | Troeger | 74/113 |
| 2,878,688 | 3/1959 | Palmer | 74/568 R |
| 2,883,882 | 4/1959 | Neukirch | 74/679 |
| 2,943,505 | 7/1960 | Parks | 74/394 |
| 2,978,918 | 4/1961 | Pollitt | 74/124 |
| 3,075,409 | 1/1963 | Amster | 74/679 |
| 3,087,355 | 4/1963 | Bassereau | 74/793 |
| 3,114,273 | 12/1963 | Boggs | 74/679 |
| 3,561,292 | 2/1971 | Lorence | 74/804 |
| 3,955,435 | 5/1976 | Arick | 74/411 |
| 4,005,618 | 2/1977 | Cohen | 74/640 |
| 4,112,778 | 9/1978 | Korosue | 74/117 |
| 4,287,792 | 9/1981 | Dailey | 74/863 |
| 4,497,221 | 2/1985 | Koser | 74/793 |
| 4,512,213 | 4/1985 | Newton | 74/805 |
| 4,640,154 | 2/1987 | Osborn | 74/805 |
| 4,656,891 | 4/1987 | Durand | 74/804 |
| 4,660,427 | 4/1987 | Fenton | 74/63 |

Primary Examiner—Dwight Diehl
Attorney, Agent, or Firm—Flehr, Hohbach, Test, Albritton & Herbert

[57] ABSTRACT

A technique for modifying an input rotation in continuously variable increments to produce a controlled rotational output is disclosed herein. This technique combines epicyclic motion of a series of planetary shafts in a parallel fashion in order to produce continuous, controlled, intermediate output in the same direction and at the same speed or a greater speed than the input rotation. This intermediate output is then modified to produce a continuous, controlled, final rotational output only when the intermediate output is greater in speed than the input. The final output can be in the same direction as the rotational input and at a speed which is proportionate to the excess speed of intermediate output.

48 Claims, 12 Drawing Sheets

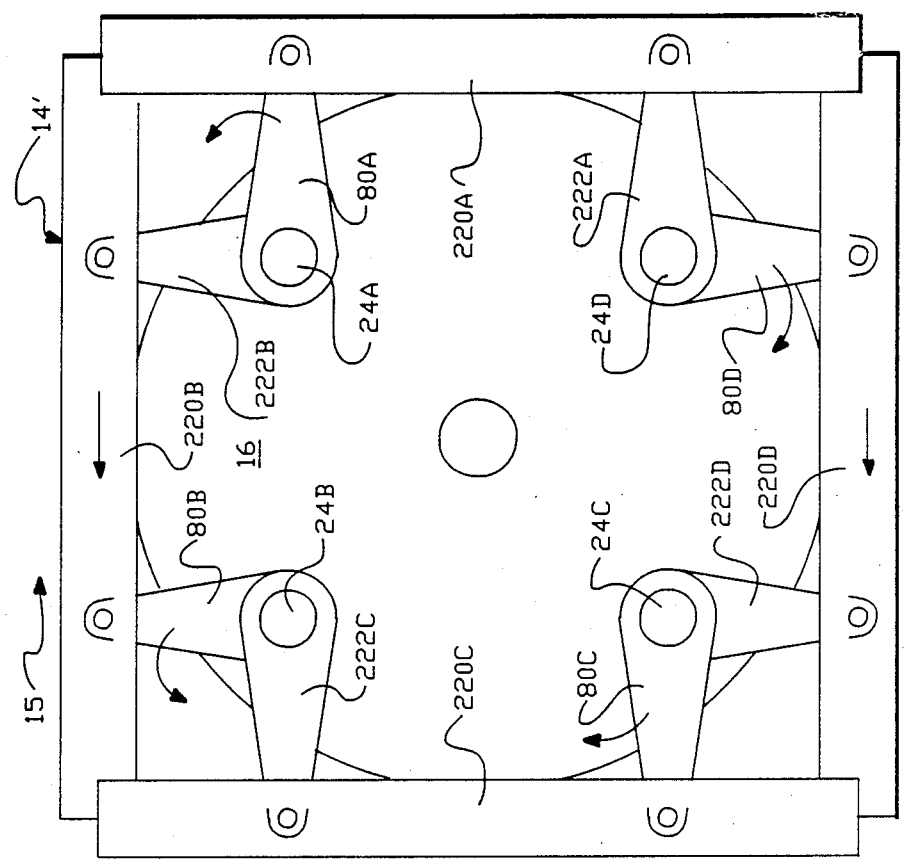
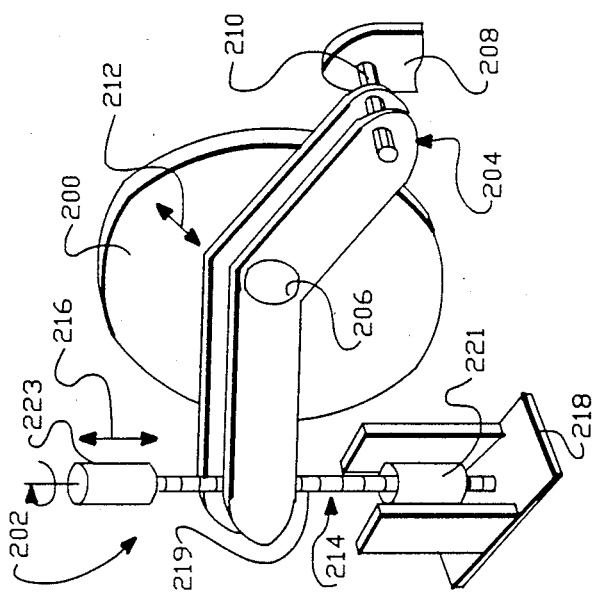
FIG.-14
FIG.-13

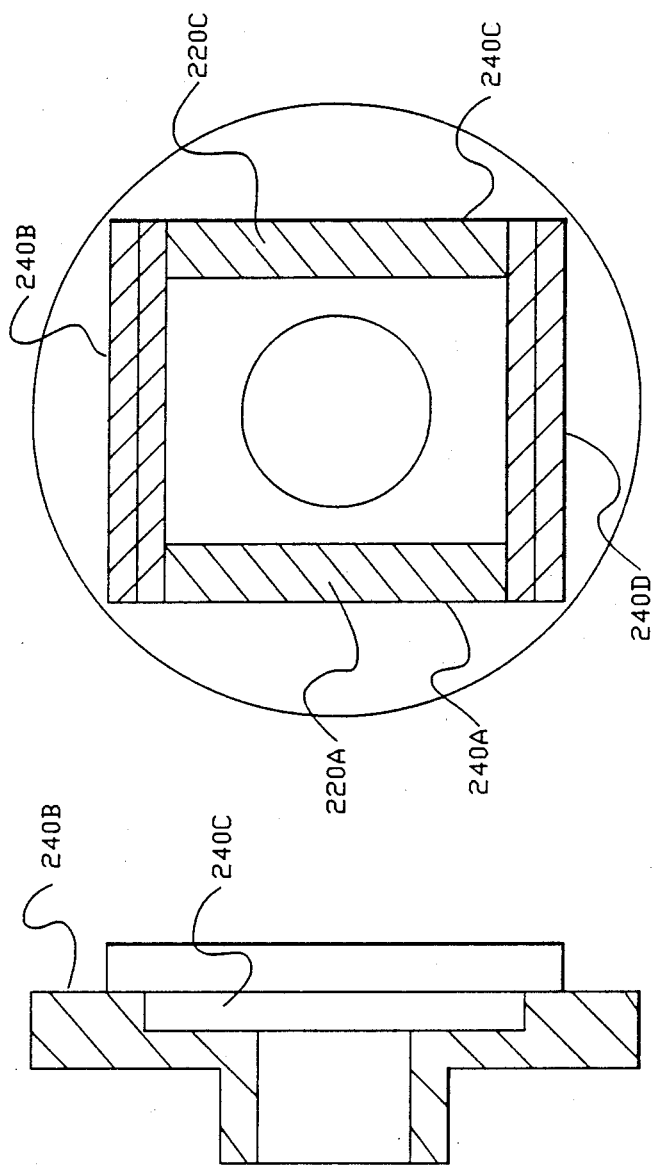

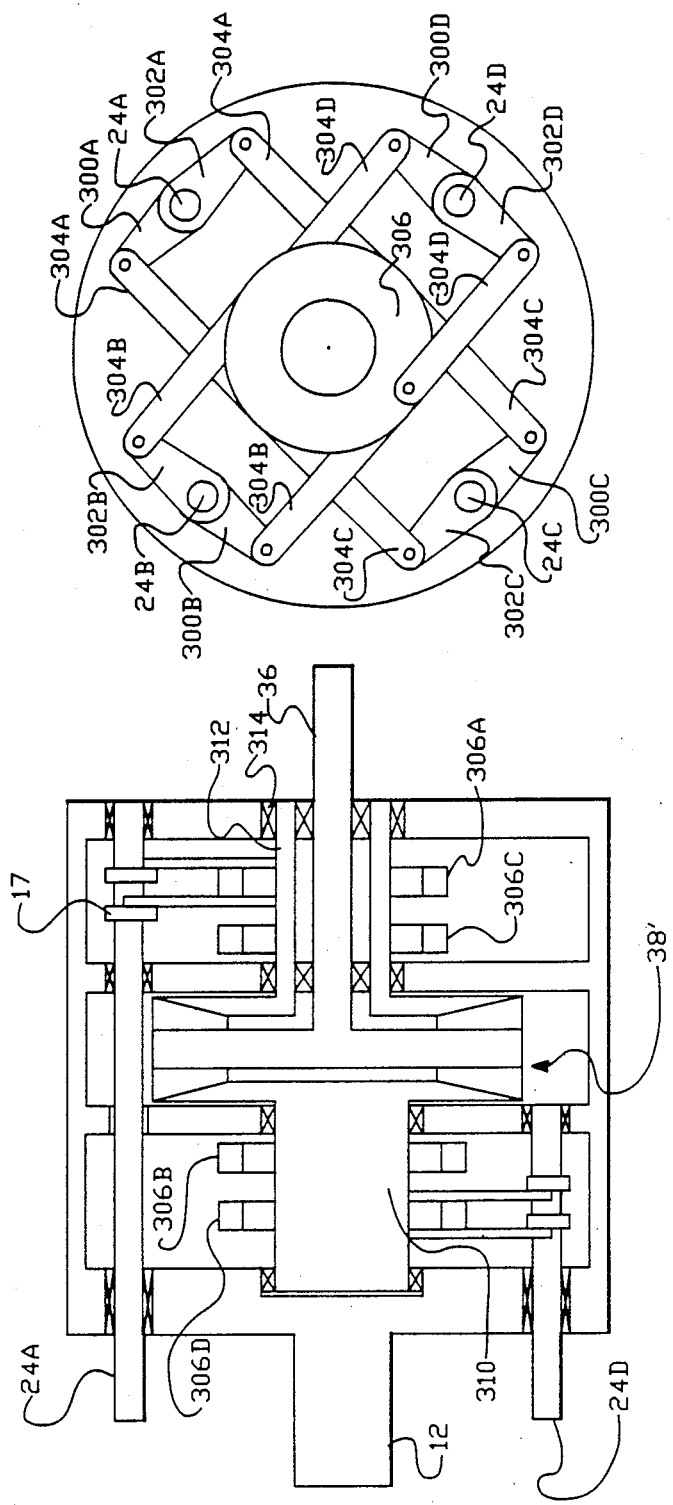

TRANSMISSION RATIO CHANGING APPARATUS AND METHOD

RELATED APPLICATIONS

This application is a continuation-in-part of U.S. patent application Ser. No. 232,472 filed Aug. 15,1988 now abandoned.

TECHNICAL FIELD

The present invention relates generally to an apparatus and method for changing transmission ratios, and relates more specifically to an apparatus and method for processing an input rotation to produce a smooth rotational output while providing continuously variable transmission ratios and a particular technique for generating epicyclic motion in this process.

BACKGROUND ART

Means for generating motive force, such as electric motors, internal combustion engines, and the like, generate power most efficiently when they operate within a relatively narrow rpm range. For example, an internal combustion engine which is designed to operate within a relatively narrow range of rpm's operates about 20-30% more efficiently than an internal combustion engine having the same power capacity which operates over a wide range of rpm's. With apparatus employing electrical motors such as power tools and tho like, variation of rotational speed (rpm) is generally achieved by pulsing the input power. Pulsing the input power, while changing the rotational speed of the electric motor, also reduces its total power. Other methods of changing the speed of electric motors, such as power factor conditioners, reduce the output power of the electric motor to achieve variable rotational speeds. With apparatus employing internal combustion engines or the like, a transmission mechanism is generally provided linking output from the engine with the drive means, for providing different gear or drive ratios between the engine and drive wheels, for example, of a motor vehicle. The principal function of the transmission is to provide acceleration from rest to a high speed through a wide speed range, while permitting the engine to operate efficiently within narrow rpm ranges.

Two types of transmissions are typically employed in motor vehicle applications. Manual transmissions require a clutch mechanism to disengage the engine from the transmission while gears in the transmission are displaced manually to provide different drive ratios between the engine and the drive wheels. Conventional motor vehicle automatic transmissions employ frictional mismatch devices, such as a hydrodynamic torque converter and spring energized clutches, to provide a cushion between mismatched transmission ratios Both of these types of conventional motor vehicle transmissions vary the transmission ratios in predetermined, discrete steps. This requires the engine to vary RPM within the domains of these steps to compensate for mismatch between steps resulting in inefficient conversion of motive force to driving force.

Continuously variable transmissions (CVT's) which provide a continuously variable transmission ratio range have also been developed for motorized vehicle applications Prior art continuously variable. transmissions provide efficient conversion of motive force to drive ratios but they require an automatic or manual clutch for disengaging the engine during stopping and reverse, and they utilize frictional devices which reduce their overall efficiency. CVT's employing a continuous rubber belt supported between two variable diameter pulleys have been used in lightweight vehicles such as snowmobiles and mopeds. CVT's having a segmented metalized belt supported between two variable diameter pulleys have been developed for commercial use and tested in small automotive engines, but they are limited in their applications, since reasonable horsepower capacity to size ratios have not been achieved One type of CVT employing a continuous segmented metalized belt supported between two variable diameter pulleys is described in "Finally—CVT," *Popular Science*, September, 1987, p. 56. U.S. Pat. No. 4,497,221 teaches a similar type of apparatus employing a fixed walking gear and a variable pitch gear chain constrained by a mechanism which expands and contracts the diameter of the gear chain.

Controllers utilizing various types of differential gear assemblies have been suggested as low-cost, rugged alternatives to electric transmissions. Differential gear assemblies, in general, transmit power with variable ratios of input to output speed while maintaining substantially steady torque at all speeds. A split belt and chain CVT, for example, may be used as a control feature for this type of differential transmission, as disclosed in "Differential Gearings—Controlling High-Power Transmissions," *Machine Design*, Apr. 21, 1988, p. 131. Although this method of differential output modification has many advantages, its performance is substantially limited by the limited torque capacities and ratio ranges achieved by existing types of CVTs.

These torque limitations on prior art CVT TECHNOLOGY are insurmountable. For example, CVTs relying on surface area of contact power transfer by traction between belts and pulleys. The power transferred is dependent on surface area of contact. CVT's change ratios by reducing effective diameter of one pulley while increasing the effect of diameter of the other pulley. Reducing effective diameter reduces the surface area of contact. Therefore, variable diameter pulley means for controlling ratios reduce power capacity proportionate to the ratio ranges controlled On the other hand, with regard to utilization of belts the relationship of belt "surface area of contact" to belt diameter, pulley diameter, pulley center-to center distance and belt strength are interrelated and optimized for the best power for size and weight To double the torque capacity of a CVT the surface area of contact must be doubled Doubling the surface area of contact increases all other aspects proportionately. Therefore, in order for a CVT used with a 60 horsepower engine running at 4200 RPM to develop 75 foot pounds of torque would require a 12" center of pulley-to-center of pulley and 18" overall in height from edge of pulley to edge-of-pulley. To make a comparable CVT for handling 1200 foot pounds of torque generated by a 411 horsepower engine running at 1800 RPM (Diesel Truck), it would require a 4' center of pulley-to-center-of-pulley and the 6' edge-to-edge with 4' diameter pulleys.

Efficient power transfer from the power generator to the drive means is, of course, a primary objective of transmission ratio changing devices Mechanical devices generally demonstrate some power loss due to friction. Devices which generate more friction demonstrate proportionally higher power losses. Mechanical devices utilizing bands, belts, and the like, rely on friction to provide the driving traction, and the friction generated by the relative motion between component belts and their driving means dissipates some of the usable power as heat. Gear drives which do not utilize bands, belts or other frictional devices, generally create substantially less friction, and consequently provide more efficient power transfer In addition, gear drives generally have large torque capacities to size and weight ratios, and thus provide an efficient transfer of rotary motion without contributing significantly to the load.

Variable speed gear drive mechanisms which generate and utilize epicyclic motion are known in the art. For example, U.S. Pat. No. 1,660,356 teaches an epicyclic speed change gear wherein epicyclic motion is generated and modified through the use of gear sets to produce a direct output. U.S. Pat. Nos. 3,955,435 and 3,087,355 similarly teach means for generating epicyclic motion and processing the epicyclic motion to produce a direct output According to the teachings of each of these patents, sinusoidal, reciprocating rotational motion is collected serially from each of several generators and conveyed to an output shaft. Since each epicyclic generator is out of phase with respect to the other epicyclic generators, a pulsating output is produced at the output shaft which represents the peaks collected from each of the epicyclic generators and arranged serially The output from these types of devices, while attempting to approximate a uniform rotational output is quite irregular in fact. Non-uniform output is undesirable for a variety of reasons, primarily because it places large periodic stresses on the component parts which result in damage to the component parts and reduce the operating lifetime d reliability of the device.

Serial processing of epicyclic motion in this fashion has several serious drawbacks Output generated in this fashion, although it may simulate a uniform output, is not uniform, since it represents only serial collection of peaks from a number of epicyclic motion generators. The amplitude of this output is proportional to the amplitude of epicyclic motion generated, which is proportional to the degree of eccentricity of the epicyclic device. Because each epicyclic generator contributes serially to the output, at any point in time, a single epicyclic generator is contributing the full output. Consequently, the torque capacity of the device is limited to the torque capacity of each single epicyclic generator. To provide sufficient torque capacity, relatively large and heavy mechanical devices must be employed, which reduces the overall efficiency of the system. In many transmission ratio changing applications, such as motor vehicle applications, it is important for all components to have a high strength to size and weight ratio. This is particularly important in automotive applications wherein the objective is to achieve greater fuel efficiency with smaller and lighter vehicles It is important for many applications that the power transmission mechanism represent as small a percentage of the total payload as is reasonably practical.

An important objective of transmission ratio changing devices is to provide proper adjustment of the torque/rpm ratio to achieve the desired output speed. In other words, at each output speed, the full torque should be delivered as output for the power generated. Only under these conditions will efficient power transfer be achieved. Proper balancing of a mechanical transmission ratio changing device is also important to reduce frictional losses, and to prevent vibration of the device or its components. Vibration causes stress on component parts which may significantly reduce their operating lifetime and reliability.

SUMMARY OF THE INVENTION

Accordingly, it is an objective of the present invention to provide transmission ratio changing apparatus and methods which achieve highly efficient power transfer from the generator to the drive means.

It is another objective of the present invention to provide transmission ratio changing apparatus and methods which provide continuously variable transmission ratios and a smooth rotational output.

It is yet another objective of the present invention to provide transmission ratio changing apparatus and methods which generate and utilize epicyclic motion to modify rotational input and produce a useful rotational output.

It is still another objective of the present invention to provide transmission ratio changing apparatus and methods which utilize epicyclic motion and process a plurality of sinusoidal rotational inputs in a parallel fashion to achieve a modified, smooth rotational output.

It is yet another objective of the present invention to provide transmission ratio changing apparatus and methods demonstrating a high power capacity to size and weight ratio and efficient torque load sharing.

It is another objective of the present invention to provide transmission ratio changing apparatus and methods which provide continuously variable transmission ratios and produce a modified rotational output.

It is yet another objective of the present invention to provide transmission ratio changing apparatus which can change ratios while under power from a zero output start point to a top speed or high output, thereby obviating the need of clutch disengagement devices or torque converters and their attendant size, weight, cost and frictional power loss.

It is a further, more general objective of the present invention to provide a technique for modifying an input rotation to produce a modified, smooth rotational output, in an uncomplicated and reliable way.

It is yet a further, more general object of the present invention to vary the speed of the last-mentioned smooth rotational output in a continuous fashion, again in an uncomplicated and reliable manner, and without requiring a clutch disengagement device or a torque converter.

It is a further, more particular object of the present invention to provide a specific uncomplicated and reliable technique for generating a particular type of epicyclic motion The apparatus and methods of the present invention provide modification of a rotational input in continuously variable increments by processing epicyclic motion in a parallel fashion to produce a modified, smooth rotational output. The apparatus of the present invention comprises a planetary assembly concentrically mounted on an input rotation shaft which is operatively connected to the power generating apparatus, so that rotation of the input shaft at system input rpm produces rotation of the planetary assembly at system input rpm. The planetary assembly includes a plurality of radially arranged, equidistantly spaced planetary offset shafts which serve as epicyclic motion collectors. Many different types of epicyclic motion generators may be used in the practice of the present invention, although the technique disclosed herein is preferred and is, itself, uniquely uncomplicated and reliable, as will be briefly described immediately below.

A preferred embodiment of the present invention includes an index plate assembly which is adjustable from an alignment which is concentric with respect to the planetary assembly in continuous increments through a variety of eccentric alignments. According to this preferred embodiment, each planetary offset shaft extends from the planetary assembly at one end and is provided with a rotatable crank arm having a crank pin mounted thereon. The crank pins are mounted in slots in the index plate assembly, which is rotated at system input rpm in synchrony with the planetary assembly. The index plate assembly is additionally provided with eccentric adjustment means providing eccentric adjustment of the index plate assembly with respect to the central axis of the planetary assembly.

When the index plate assembly is aligned concentrically with respect to the planetary assembly, the crank pins and crank arms do not move along the index plate slots as the planetary assembly and the index plate rotate in synchrony, and the planetary offset shafts do not rotate about their own central longitudinal axes. In this concentric alignment position, reciprocating epicyclic motion is not generated, and system input rpm alone is processed as output.

When the index plate is aligned eccentrically with respect to the planetary assembly, however, while the index plate assembly and the planetary assembly continue to rotate synchronously at system input rpm, the crank pins move along the index plate slots and the planetary offset shafts are rotated about their central axes to compensate for the eccentric alignment of the index plate assembly. Reciprocating epicyclic motion is thereby generated and collected as rotation of the planetary offset shafts about their longitudinal axes.

The epicyclic motion collected at the planetary offset shafts as rotation about their longitudinal axes may be characterized as sinusoidal motion both with respect to position and speed. With each synchronous revolution of the planetary and index plate assemblies, each planetary offset shaft rotates an equal amount alternately in opposite directions. In terms of speed, the amplitude (maximum speed) of the sinusoidal motion of each planetary offset shaft is equal and is proportional to the degree of eccentricity of the index plate assembly with respect to the axes of the input shaft and the planetary assembly. Due to the radial arrangement of planetary offset shafts, the sinusoidal motion of each planetary offset shaft is out of phase with respect to the other planetary offset shafts by a degree which corresponds to the radial arrangement of the planetary offset shafts. The sinusoidal motion of opposite planetary offset shafts is, for example, 180° out of phase.

It is an important feature of the present invention that the sinusoidal motion of the planetary offset shafts be processed in a parallel concurrent fashion to modify the rotational input and produce as uniform or smooth a rotational output as possible. According to a preferred embodiment, a processing assembly including a recombination differential gear assembly is provided for this purpose. The differential gear assembly is rotated at system input rpm synchronously with the index plate and planetary assemblies. The sinusoidal motion of each planetary offset shaft in one direction of rotation (clockwise or counterclockwise) is preferably conveyed to the processing assembly by suitable means, such as overrunning gears. Overrunning gears mounted on each of the planetary offset shafts function to transfer sinusoidal rotational motion in one direction of rotation while they remain motionless, or freewheel, in the opposite direction of rotation. Overrunning gears mounted on a first pair of opposed planetary offset shafts, in combination, preferably provide a first input to the recombination differential gear assembly. Since the epicyclic motion collected at opposite planetary offset shafts is 180° out of phase, input to one side of the recombination gear assembly is essentially continuous. Likewise, overrunning gears mounted on a second pair of opposed planetary offset shafts provide a second although 90° out of phase input to the other side of the recombination gear assembly which is also essentially continuous. The recombination differential gear assembly functions to average the two essentially continuous inputs and generate a rotational output which represents the system input rotation combined with an additive or subtractive rotational element (depending on the direction of the overrunning gears) derived from the sinusoidal motion of the planetary offset shafts.

Since the recombination differential assembly functions to average two essentially continuous but out of phase inputs and to precisely balance torques applied to each side of the differential, each planetary shaft and the mechanisms associated therewith bear a portion of the torque load transferred through the device, a smooth output is generated. In addition, due to the parallel form of processing motion according to the apparatus and method of the present invention, each planetary offset shaft and the mechanisms associated therewith bear an equal fraction (percentage) of the torque load transferred through the device. Periodic stresses on all the components of the transmission changing device are concomitantly reduced, resulting in significant improvements in the reliability of the device and its operating lifetime. In addition, smaller, lighter weight components may be utilized in the apparatus of the present invention, since each component bears only a fraction of the total torque load. The process and apparatus of the present invention provides more efficient power transfer, since minimal amounts of power are dissipated during operation as friction.

Control of the rotational output is provided simply by regulating the degree of eccentricity of the index plate assembly with respect to the axes of the input shaft and the planetary assembly The degree of eccentricity of the index plate assembly is determinative of the amplitude of sinusoidal motion of the planetary offset shafts (in terms if speed), and is thus determinative of the additive or subtractive element which is combined with the system input rotation to produce a smooth rotational output. Since the eccentricity of the index plate assembly is variable in continuous increments, continuously variable transmission ratios are expressed as output.

The apparatus and method of the present invention providing modification of a rotational input in continuously variable increments by processing sinusoidal motion in a parallel fashion to produce a smooth rotational output in addition to input is useful for a variety of applications. For example, all forms of prop driven and aircraft marine vehicles can benefit from the present invention in that the CVT can allow for initial reduction in speed for high-torque start up and acceleration while still allowing full rpm for top end speed. Furthermore, the vehicle speed versus RPM balancing of the IVT can maximize fuel economy over a variety of cruising speeds instead of one factory designated speed. Since prop driven craft can idle at a stop with their props engaged, the intermediate output of the IVT is sufficient to this task with no differential output modification required.

All of the applications just recited do not require that the rotational output be modified to zero. For many applications, however, it may be desirable to treat the rotational output derived as described above, as an intermediate rotational output. The intermediate rotational output may then be manipulated in a variety of ways to provide a final rotational output in reverse, neutral, and/or forward directions. For example, according to preferred embodiments of the present invention, the intermediate rotational output represents one input to a final modification differential gear assembly. The second input to the final modification differential gear assembly is preferably derived from rotation of the planetary assembly at system input rpm, and this second input is preferably a predetermined fraction of the system input rpm. Final rotational output is then produced as result of the two inputs to the final modification differential gear assembly, and the final rotational output remains dependent upon the amplitude of the sinusoidal motion generated.

Depending on the set fraction of input RPM used as the second input to the final modification differential, the final rotational output can have as a starting point any rotation and will have an adjustment range equal to the maximum epicyclic added motion above input RPM. This final modification differential basically relocates a variable adjustment generated previously, according to second input speed. If second input speed is set to cancel the input rotation component of the intermediate output, then the ratio range will start at zero RPM.

BRIEF DESCRIPTION OF THE DRAWINGS

The present invention will be described in more detail hereinafter in conjunction with the drawings, wherein:

FIG. 13 is a perspective view of a modified assembly for controlling the eccentricity of the index plate relative to assembly;

FIG. 14 is a front elevational view of a modified portion of the apparatus illustrated in FIG. 1, specifically a modified planetary assembly and associated components for connecting the planetary assembly with the index plate forming part of the apparatus;

FIG. 18 is a sectional view of the index plate of FIG. 17, taken generally along line 18—18 in FIG. 17;

FIG. 19 is a front elevational view of the index plate of FIG. 17, with certain components of the arrangement of FIG. 14 superimposed in their operating positions adjacent the index plate;

FIG. 20 is a still further modified version of the apparatus of FIG. 1; and

FIG. 21 diagrammatically illustrates an operational feature of the modified arrangement of FIG. 20.

DESCRIPTION OF PREFERRED EMBODIMENTS

Figure 1:
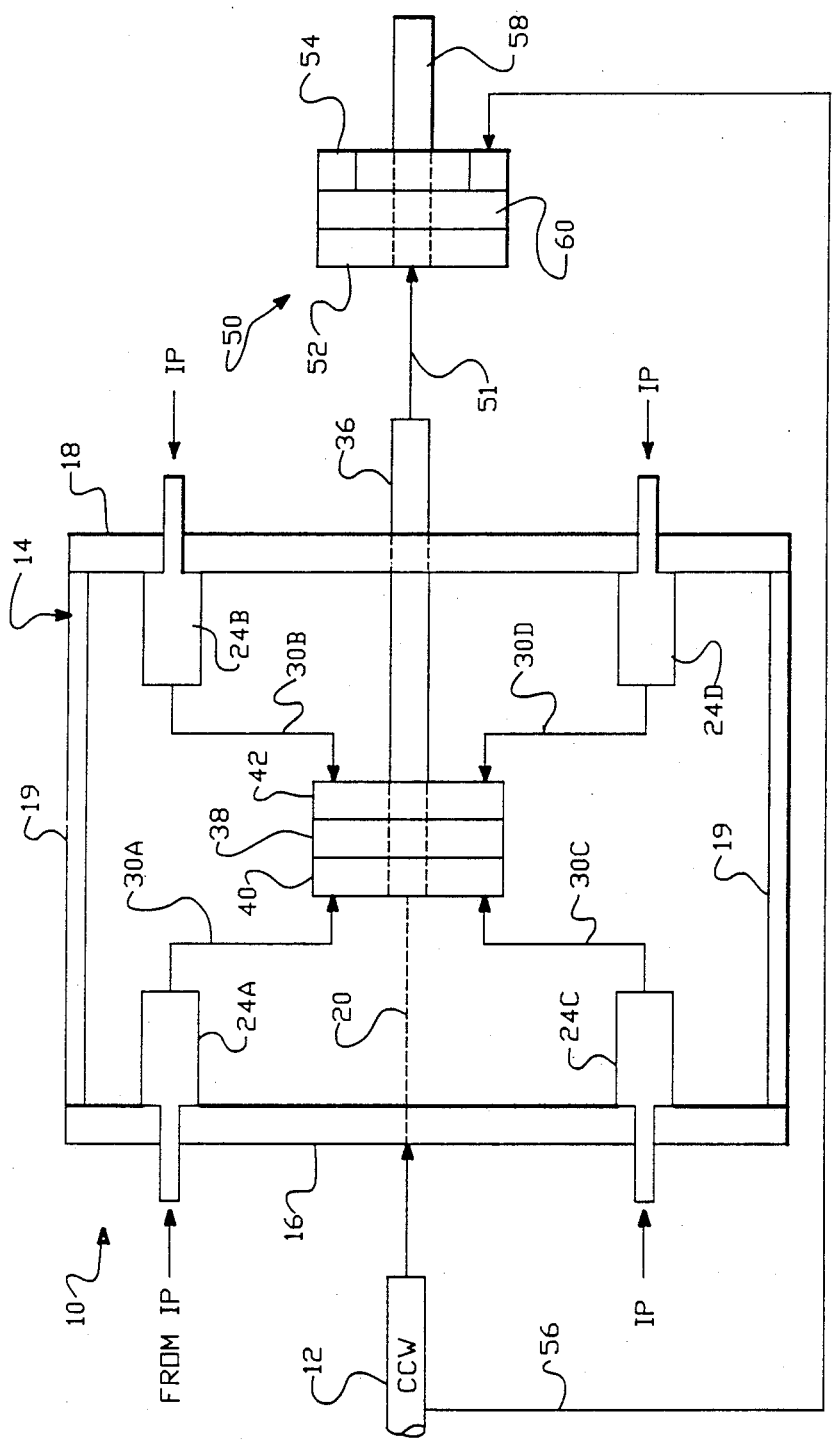
FIG. 1 is a flow diagrammatic illustration of an apparatus designed in accordance with the present invention to modify an input rotation to produce a modified uniform rotational output, and specifically a transmission ratio changing apparatus.

Referring first to FIG. 1, attention is directed to an apparatus for modifying an input rotation to produce a modified, substantially smooth rotational output. This apparatus which is generally indicated by the reference numeral 10 is illustrated diagrammatically, partially in a flow chart type manner and partially shown in mechanized form so as to present a clear understanding of the present invention. An actual working embodiment of the apparatus will be described in detail hereinafter in conjunction with FIGS. 9 to 11. As will be seen then, this apparatus is especially suitable for use in an uncomplicated and yet reliable continuously variable, clutchless transmission.

In FIG. 1, the diagrammatically illustrated apparatus is shown there including an input shaft 12 powered by suitable means (not shown), for example, an internal combustion engine, so as to establish an input rotation. For purposes of this discussion, it will be assumed that the input rotation is in one direction, specifically the counterclockwise direction and at a constant speed. Apparatus 10 also includes a planetary assembly 14 which is comprised of a pair of spaced-apart, parallel plates 16 and 18 connected together by cross bars 19 and mounted for rotation with shaft 12 about a coextensive planetary axis 20, in the same direction and at the same speed as input shaft 12. Four epicyclic motion generating shafts 24A, 24B, 24C and 24D are mounted within the confines of planetary assembly 14 and form part of the latter. The shafts 24A and 24C are shown mounted to plate 16 while shafts 24B and 24C are shown mounted to plate 18. As will be seen hereinafter in the description of the actual working embodiment, all of the shafts are actually equally circumferentially spaced about planetary axis 20 such that the shafts 24A and 24C are opposite one another and the shafts 24B and 24D are opposite one another. The four shafts are illustrated in the manner shown in FIG. 1 so that all four can be seen at one time In any event, all four shafts, hereinafter referred to as epicyclic shafts are mounted for rotation with plates 16 and 18 and therefore orbit about planetary assembly axis 20 in the same direction and at the same speed as input shaft 12. This orbiting motion defines the "base line" rotational component of each shaft, as will also be seen hereinafter. At the sam=time, each epicyclic shaft 24 is mounted rotatably within the planetary assembly for both clockwise and counterclockwise rotation about its own axis. Thus, as will be seen, each epicyclic shaft is capable of generating epicyclic motion consisting of an orbital component about planetary axis 20 and a rotational component about its own axis.

As will be described in more detail hereinafter, overall apparatus includes an index plate 84 (shown in FIG. 8) which is coupled to planetary assembly 14 for rotation with this assembly and With input shaft 12 in the same direction and at the same speed as both. However, as will also be seen, the index plate is mounted for lateral movement (normal to axis 20) between a position in which the axis of the index plate is concentric with the axis of the planetary assembly and other positions in which the two axes are eccentric to one another. Means are provided for adjusting the lateral position of the index plate in order to vary the positional relationship between these axes, as will be seen.

All of the epicyclic shafts 24 are coupled to the index plate so as to rotate about their own respective axes in specific ways in response to the rotating index plate 84 so long as the axis of the latter is eccentric with respect to planetary axis 20 On the other hand, if the axes of the index plate and planetary assembly are concentric, no axial rotation will be imparted to the shafts 24. Therefore, for purposes of the discussion to immediately follow, it will be assumed that the axes are eccentric to one another. Recalling that the four shafts are simultaneously orbiting about planetary axis 20, it should be apparent that each shaft defines the previously recited epicyclic motion consisting of an orbital component in the same direction and at the same speed as the input shaft, and a rotating, actually reciprocating, component. As will be seen hereinafter, as a result of the way in which each shaft is coupled to the index plate, this rotating or reciprocating component first increases then decreases in speed in the same direction as the orbital component during one half- cycle of the orbital component and thereafter increases and then decreases in speed in the opposite direction during the second half cycle of the orbital component, in accordance with a particular sinusoidal waveform. As will be seen immediately below, except for the fact that the four shafts rotate out of phase with one another in specific ways to be described, their rotating components are identical and hence the waveforms are identical in shape, frequency and amplitude.

Figure 2A:
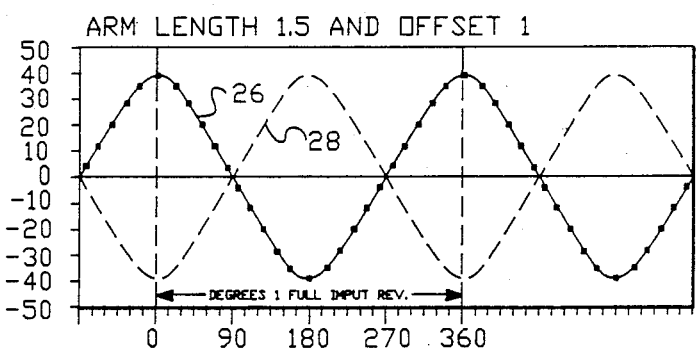
FIGS. 2A and 2B graphically illustrates by means of curves (waveforms) one operational feature of the apparatus shown in FIG. 1.

Referring to FIG. 2A, the solid line waveform 26 shown there corresponds to the position of the rotating component forming the epicyclic motion of shaft 24A during one input rotation The dotted line waveform 28 shown there corresponds to the position of the rotating component forming the epicyclic motion of opposed shaft 24C during one input rotation. Note specifically that waveform 26 increases to a peak amplitude, decreases to a minimum amplitude and then increases to a point corresponding with its starting angle. The increasing portion of waveform 26, as shown in solid lines in FIG. 2B, corresponds to counterclockwise motion of shaft 24A The decreasing portion of waveform 26, as shown by dotted lines in FIG. 2B, corresponds to clockwise motion of shaft 24A. The peaks of waveform 26 correspond to the maximum movement of shaft 24A counterclockwise and clockwise about its own axis as the shaft orbits about planetary axis 20 and these peaks are proportionate to the eccentricity between the index plate and planetary assembly. If the index plate is concentric with planetary assembly 14, shaft 24A will not rotate about its own axis, as stated above, and hence the waveform 26 would be a straight line (at zero degrees) representing no reciprocating motion added to shaft 24A while it undergoes the orbiting motion imparted by input shaft 12. However, assuming that the index plate and planetary assembly are eccentric, the overall epicyclic motion includes both the orbital motion imparted by input shaft 12 and the reciprocating component of waveform 26. This entire motion may be considered as the output motion diagrammatically represented by arrow 30A.

Waveform 28 which represents the epicyclic motion of shaft 24C is identical to waveform 26, with one exception. As illustrated in FIG. 2A, the rotating component of waveform 28 is mechanically 180 degrees out of phase with the rotating component of waveform 26 Thus, when shaft 24A is rotating clockwise, shaft 24C is rotating counterclockwise (as shown in solid lines in FIG. 2B) and when shaft 24A is rotating counterclockwise, shaft 24C is rotating clockwise (as shown in dotted lines in FIG. 2B). Thus, waveform 28 represents the reciprocating motion of shaft 24C. When added to the orbiting motion imparted by input shaft 12 the entire motion may be considered as the output motion diagrammatically represented by arrow 30C.

The epicyclic motion of shafts 24B and 24D are identical to the epicyclic motion just described, except that the rotating components of shafts 24B and 24D are mechanically 180 degrees out of phase with one another and 90 degrees out of phase mechanically with shafts 24A and 24C. This is diagrammatically illustrated by the waveforms 32 and 34 shown in FIG. 3 representing the reciprocating motions of shafts 24B and 24D, respectively. As in FIG. 2B, the solid segments of the waveforms in FIG. 3 represent counterclockwise movement and the dotted segments represent clockwise movement of the shafts. Arrows 30B and 30D in FIG. 1 represent the epicyclic motion outputs from shafts 24B and 24D, respectively.

Figure 2B:
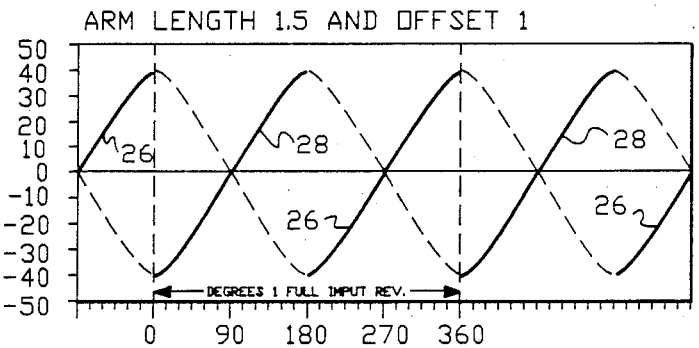
Figure 3:
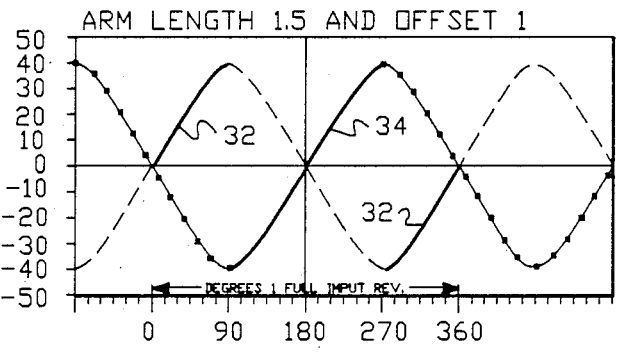
FIG. 3 graphically illustrates by means of curves (waveforms) another operational feature of the apparatus shown in FIG. 1.
Figure 4:
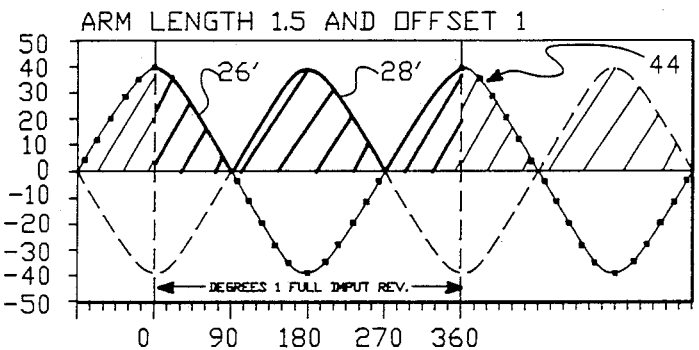
FIG. 4 graphically illustrates by means of curves (waveforms) still another operational feature of the apparatus shown in FIG. 1.
Figure 5:
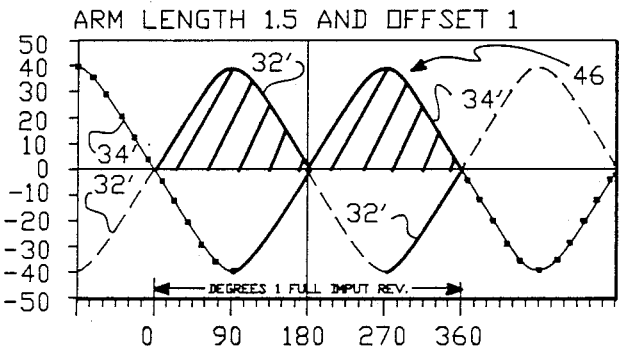
FIG. 5 graphically illustrates by means of curves (waveforms) yet another operational feature of the apparatus shown in FIG. 1.

As stated above, the waveforms 26, 28, 32 and 34 in FIGS. 2A, 2B and 3 represent the clockwise and counterclockwise movement of shafts 24A–D from a positional standpoint. These waveforms do not provide any information about the speed of the shafts as they reciprocate. FIGS. 4 and 5, on the other hand, display waveforms which represent the speed of the four shafts relative to one another and relative to the baseline, that is, to the speed of input shaft 12 and the planetary assembly. Note specifically waveform 26' which is sinusoidal in shape. This waveform represents the speed of shaft 24A as it moves counterclockwise and clockwise. As indicated previously, the shaft starts out rotating counterclockwise, for example, from zero rotation to a maximum speed then slows down to zero rotation again and begins to rotate in the opposite direction, clockwise for example, to a maximum speed in that direction and then slows down to zero rotation again where the cycle is repeated In FIG. 4, the positive half-cycles of waveform 26' represent the counterclockwise motion of shaft 24A from a speed standpoint and the negative half-cycles represent its clockwise movement Each full cycle represents one full rotation of the input shaft 12 and planetary assembly 14 and the baseline of the waveform (the points at which the shaft stops rotating) represents the orbiting component of shaft 24A which is the baseline speed of the planetary assembly The maximum speed of the shaft in either the clockwise or counterclockwise direction, which corresponds to the peak amplitude of each half-cycle, is proportional to the way in which the index plate is eccentric. Thus if the index plate is indeed, concentric, shaft 26A does not rotate at all and the peak amplitude of waveform 26' is zero, leaving only the orbiting component representing the movement of the shaft.

Waveform 28' in FIG. 4 represents the rotating speed of shaft 24C and, hence, it is superimposed on waveform 26', 180° out of phase with this latter waveform. That is because the shaft 24C rotates 180° out of phase with shaft 24A, as indicated above. Thus, when shaft 24A is at maximum speed counterclockwise, shaft 24C is at maximum speed clockwise, and so on. In a similar manner, FIG. 5 illustrates waveforms 32' and 34' which represent the rotating speed of shafts 24B and 24D, respectively It can be seen from FIG. 5 that these two waveforms (and the rotational speed of these two shafts) are 180° out of phase with one another and 90° out of phase with the waveforms 26' and 28' (and the speed of their associates shafts 24A and 24C) Thus, when the rotational speed of each of the shafts 24A and 24C is at a maximum, the speed of each of the shafts 24B and 24D is at a minimum and vice-versa.

Returning to FIG. 1, overall apparatus 10 is shown including what may be referred to as an intermediate output shaft 36 which carries its own drive gear arrangement 38, specifically a recombination bevel gear differential assembly to be described hereinafter. This gear arrangement includes opposing bevel gear inputs 40 and 42 such that intermediate output shaft 36 rotates in a continuous, substantially smooth manner at a speed equal to or greater than the speed of input shaft 12 and in the same direction as the input shaft. In order to accomplish this, the two bevel gear inputs 40 and 42 are simultaneously driven by the epicyclic outputs of shafts 24A/C and 24B/D, respectively, in the manner to be described immediately below.

In FIG. 1, the epicyclic output motions from the two shafts 24A and 24C are shown applied to bevel gear input 40. In actuality, shaft 24A drives gear input 40 only during its counterclockwise positive half-cycle by way of known over running gearing while shaft 24C drives the same gear during its counterclockwise half-cycle 180 degrees after gear arrangement is driven by shaft 24A. Both shafts over run during their clockwise negative cycles. Thus, gear input 40 combines the two reciprocating motions of shaft 24A and 24C to produce a continuous rotation which is represented by the positive half-cycles of waveforms 26' and 28' in FIG. 4 which combined waveform will, hereafter be referred to as waveform 44 superimposed on the input motion of the planetary assembly 14 and input shaft 12. Note that this combined motion represented by waveform 44 varies in speed between a minimum speed equal to the speed of the planetary assembly 14 and input shaft 12 to a maximum speed corresponding to the maximum speed of the rotating component of each of the shafts 24A and 24C. This maximum speed depends upon the degree to which the previously recited index plate 84 is eccentric with respect to planetary assembly 14 as indicated above.

Gear input 42 combines the outputs of shafts 24B and 24D in the same manner described immediately above That is, shaft 24B drives gear input 42 during its counterclockwise positive half-cycle only, as does shaft 24D This epicyclic motion is represented by the positive half-cycles of waveforms 32' and 34' in FIG. 5, hereinafter referred to as waveform 46. The only difference between waveform 46 and waveform 44 is that they are 90° out of phase with one another. That is because the rotating components of shafts 24B and 24D (waveforms 32' and 34') are respectively mechanically 90 degrees out of phase with the rotating components (waveforms 26' and 28') of waveform 44.

Figure 6:
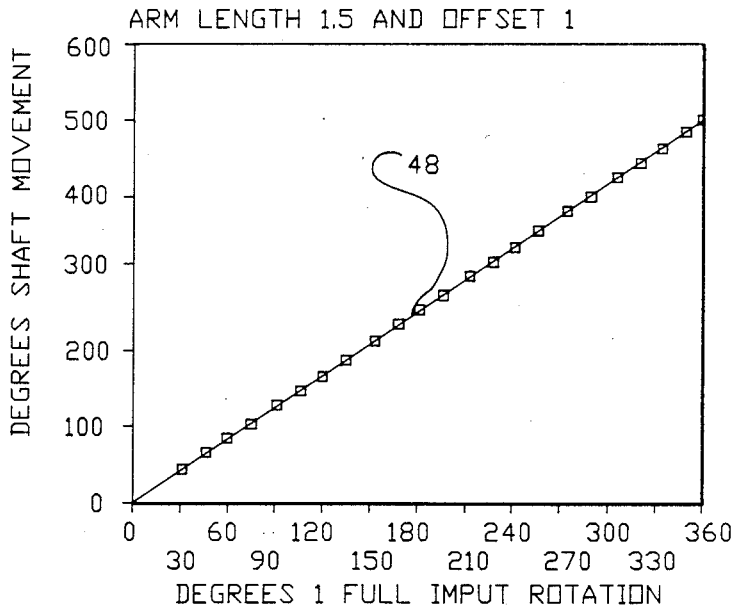
FIG. 6 graphically illustrates by means of curves (waveforms) a further operational function of the apparatus shown in FIG. 1.

It is important to emphasize here that the epicyclic outputs represented by waveforms 26/28 and 32/34 (positionally speaking) and, waveforms 44 and 46 (from the standpoint of speed) are simultaneously applied to gear arrangement 38 through bevel gear inputs 40 and 42 that is, in parallel. As a result of this simultaneous or parallel application of the two rotational motions, arrangement 38 averages the two and the resultant rotation, as indicated in FIG. 6 from a positional standpoint and FIG. 7 from the standpoint of speed, is a relatively smooth continuous output. This output is represented positionally at 48 in FIG. 6 and its speed is represented at 48' in FIG. 7. If the index plate is concentric with planetary assembly 14, then the amplitude of each waveform 44 and 46 would be zero, that is, the output of gear arrangement 38 would be the average of the two orbital components transferred to bevel gears inputs 40 and 42 which equals input rotation in speed and in direction.

Figure 7:
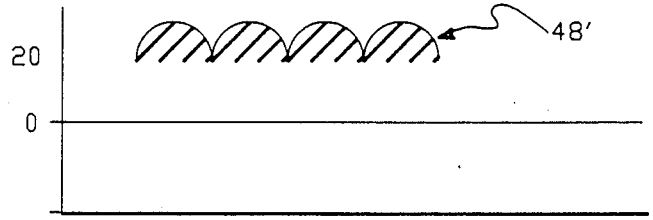
FIG. 7 graphically illustrates by means of curves (waveforms) still a further operational function of the apparatus shown in FIG. 1.

Referring specifically to the waveform 48' prime in FIG. 7, as stated above, this waveform represents the output speed of intermediate shaft 36 as a result of averaging the input rotations of waveforms 44 and 46, from the standpoint of speed. Thus, at a given eccentricity between fixed plate 88 and planetary assembly 14, the intermediate output shaft 36 will rotate in accordance with a regular, oscillating output with four maxima and four minima per input shaft rotation at a speed above the baseline speed of the planetary assembly and input shaft, depending upon the degree of eccentricity of the index plate The degree to which the intermediate output shaft oscillates between its four maxima and four minima depends upon the magnitude of eccentricity of the index plate. Speed and oscillation magnitude increase steadily with increases in eccentricity. With small eccentricity offsets, the increase is essentially linear and at larger offsets, the magnitude of oscillation increases more and more rapidly. In an actual working embodiment to be described below, within the range of eccentricity offsets (0 to 1 inch), the speed oscillation magnitude goes from essentially zero (no offset) to a maximum magnitude of about 13% (+ −6.5% of the speed of the output shaft 36). Even this maximum point of oscillation is quite small for many of the intended functions of the overall transmission apparatus and can be viewed as substantially smooth, although not perfectly uniform. For purposes herein, when reference is made to a smooth output, it is contemplated to include a small amount of oscillation represented by the output waveform 48'. This small amount of oscillation can barely be seen in the corresponding output waveform 48.

Returning to FIG. 1, as represented by arrow 51, the rotary motion of output shaft 26 is applied to one input of an epicyclic differential assembly 50 which will be described in detail hereinafter. For the moment, it suffices to say that the rotary motion of shaft 36 is applied to the epicyclic differential through its ring gear 52. At the same time, the other input gear 54 (an input spider gear) of the differential assembly receives rotary motion corresponding to a certain percentage of the input rotation, as diagrammatically indicated by means of arrow 56. The epicyclic differential assembly is configured so that these two inputs combine to drive an ultimate output shaft 58 through a solar gear 60 at a speed depending upon the magnitude of its input from shaft 36 verses spider input percentage More specifically, if shaft 36 is rotating at the input speed of shaft 12, which is the case when the index plate is concentric with the planetary assembly, then ultimate output shaft 58 does not rotate at all. It does not start rotating until the index plate is made eccentric and shaft 36 starts rotating at a greater speed than the input shaft. At that time, and only at that time does output shaft 58 start rotating As will be seen hereinafter, in an actual working embodiment, epicyclic differential assembly 50 is configured so that output shaft 58 increases at a rate of three times that of the input shaft 36 after subtracting out its input speed. For example, if shaft 36 is operating at 1.2 time the input speed of shaft 12. Then output 58 is 0.6.

Figure 8:
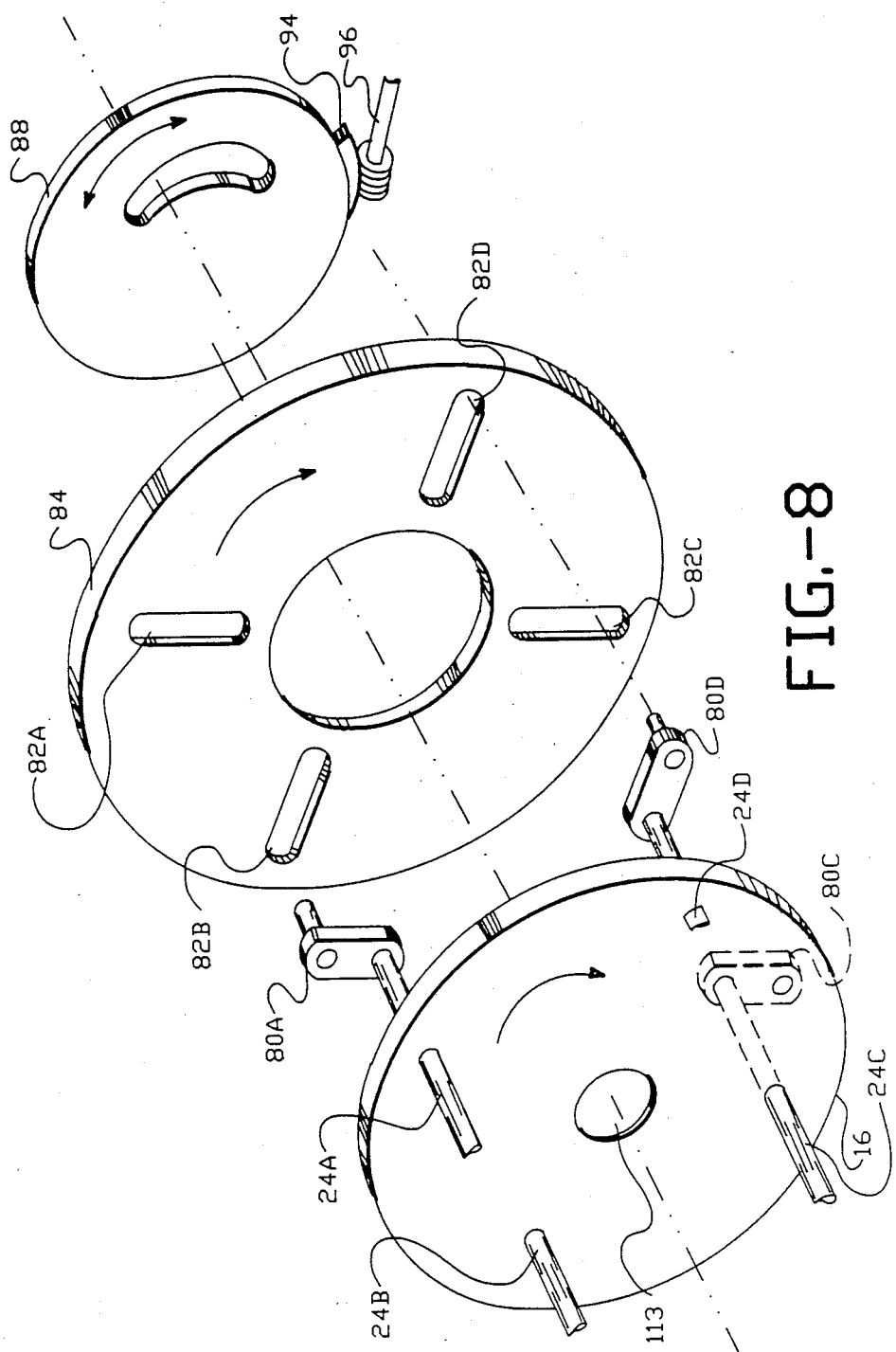
FIG. 8 is a diagrammatic illustration, in exploded perspective view, of particular components forming part of the overall apparatus illustrated in FIG. 1, specifically an arrangement designed in accordance with the present invention for generating epicyclic motion.

Overall apparatus 10 and its method of operation has been described above diagrammatically. Attention is now directed to FIGS. 8-11 for a detailed discussion of an actual working embodiment of apparatus 10. For purposes of clarity, the components forming part of the diagrammatically illustrated apparatus shown in FIG. 1 and corresponding components in the actual working embodiment shown in FIGS. 8-11 have been designated by like reference numerals As seen best in FIG. 9, input shaft 12 is supported for rotation within bearings 70 carried by a vertically extending front support 72 and is fixedly connected to the outer face of plate 16 forming part of overall planetary assembly 14 in axial alignment with the planetary assembly. In this way, input shaft 12 causes the planetary assembly 14 to rotate in the same direction and at the same speed as the input shaft, that is, at system input RPM. As described previously in conjunction with FIG. 1, the planetary assembly is comprised of spaced apart parallel plates 16 and 18 joined together by cross bars (or struts) 19. The planetary assembly is supported for rotation at one end (plate 16) by input shaft 12 and at its opposite end (plate 18) by means of a tubular axle 72 which rides in a bearing 74 located in a vertically extending mid-support plate 78. Still referring to planetary assembly 14 as stated previously, this assembly contains epicyclic motion generating shafts 24A, 24B, 24C and 24D. In FIG. 1, they are shown diagrammatically at the same plane. In actuality, as best illustrated in FIGS. 8 and 11, the four shafts are radially positioned with respect to, equally spaced about, and orbiting the center of the planetary assembly, parallel to each other and the input shaft 12. Accordingly, all four shafts rotate with the planetary assembly and therefor orbit about its axis 20, as described previously As also stated previously, the four shafts are operatively connected to an index plate and reciprocate back and forth about their own axes depending upon the degree of eccentricity between the index plate and the planetary assembly.

Figure 9:
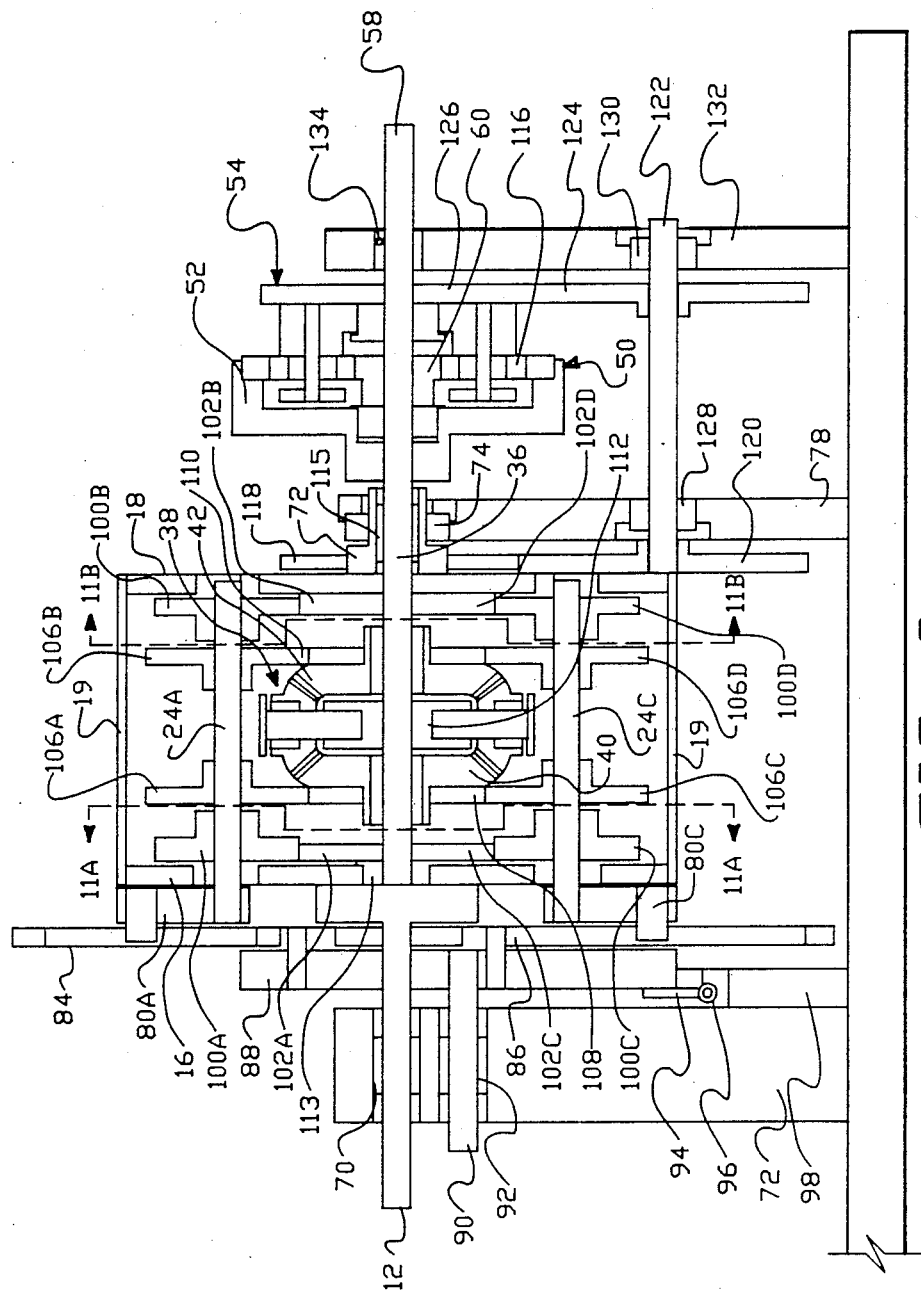
FIG. 9 is a sectional view of an actual working embodiment of the apparatus shown in FIG. 1, taken generally along lines 9—9 in FIG. 10.
Figure 10:
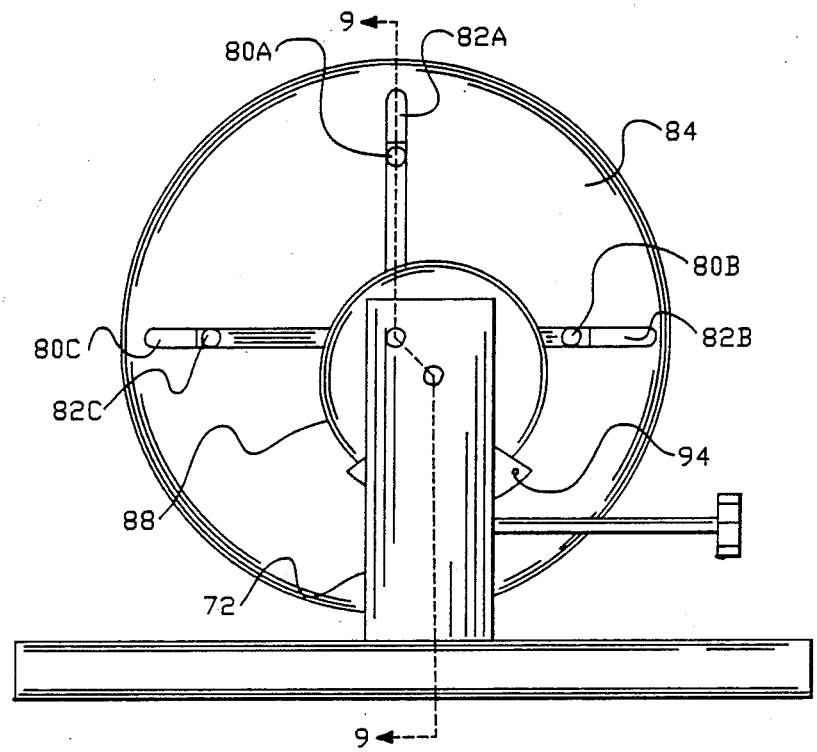
FIG. 10 is a left-hand end view of the apparatus of FIG. 9, as viewed in FIG. 9.
Figure 11A:
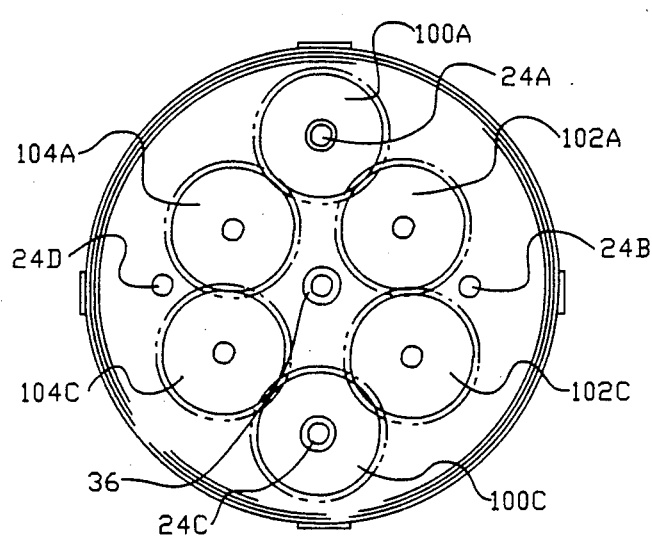
FIG. 11A is a sectional view of the apparatus of FIG. 9, taken generally along the line 11A—11A in FIG. 9.
Figure 11B:
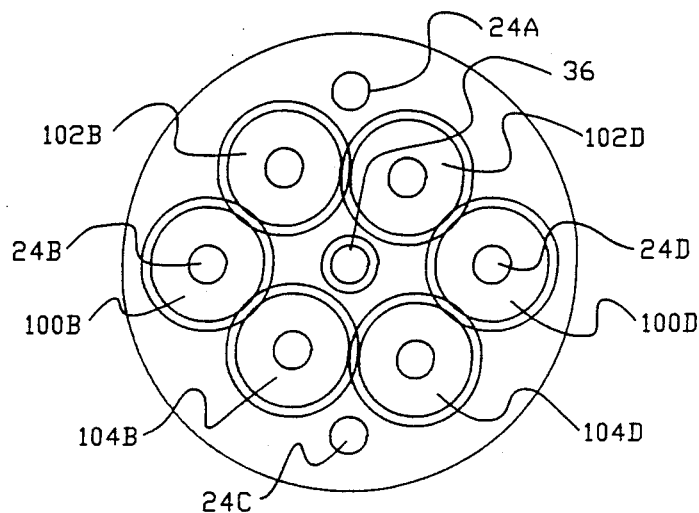
FIG. 11B is a sectional view of the apparatus of FIG. 9, taken generally along lines 11B—11B in FIG. 9.

Turning specifically to FIG. 8 in conjunction with FIGS. 9, 10 and 11, attention is now directed to the way in which shafts 24A-D are caused to reciprocate in the manner described previously. To this end, each of the shafts 24A-24D extend out beyond plate 16 so as to define a shaft input. These shaft inputs carry respective crank mechanisms 80A, 80B, 80C and 80D which are disposed within cooperating slots 82A, 82B, 82C and 82D, respectively, in the previously mentioned index plate which is shown in FIGS. 8-11 at 84. As best shown in FIG. 9, the index plate can rotate freely upon rollers 86 in its inside diameter and these rollers are, in turn, supported by an index pivot 88 The index pivot, in turn, is supported for at least limited rotation by means of a pivot plate shaft 90 supported by bearings 92 in front support 72. Rotation of the index plate is controlled by means of a worm gear segment 94 fixedly connected to the bottom of the pivot and by matching a worm pinion 96 held by an adjustment support 98. The matching worm pinon can be actuated, that is, rotated, in order to rotate the index pivot by means of an actuator rod 100.

It is important to note that index pivot 88 is not concentric to input shaft 12 and therefore it is not concentric to index plate 84, as best illustrated in FIG. 10. As a result, by causing the index pivot 88 to rotate using actuating rod 100, the index plate 84 is caused to move about an arc which is dependent upon the degree of eccentricity between the index pivot and index plate. This, in turn, allows the index plate to either be made concentric to or eccentric (in varying degrees) from the center line of rotation of planetary assembly 14, for the reasons described previously.

Index plate 84 is synchronized in rotation with planetary assembly 14 by way of main synchro gears 100A, 100B, 100C and 100D which are respectively affixed to shafts 24A, 24B, 24C and 24D. Synchro gears 100B and 100D are shown for illustrative purposes in the same vertical plane as gears 100A and 100C, actually on shafts 24A and 24C. They are, in fact, offset 90° with respect to gears 100A and 100C in the same way as and actually on he epicyclic motion generating shafts 24B and 24D themselves. Gears 100A and 100C are interconnected for opposite rotation by synchro idlers 102A, 104A, 102C and 104C. Gears 100B and 100D are interconnected for opposite rotation by synchro idler gears 102B, 104B, 102D and 104D. See FIGS. 11A and 11B. The Synchronizer sets only allow the cranks of opposing shaft pairs, e.g. shaft pairs 24A and C or 24B and D, to counterrotate (that is, to rotate in opposite directions) in synchronism to each other (that is, the opposing shafts move equal distance during any given time increment). On the other hand, to advance or retard rotation of the index plate relative to rotation of the planetary assembly would require that these shaft pairs rotate in the same direction as each other or in opposite directions but different distances per increment of tim (i.e., out of synchronism). Therefore, it should be apparent that the synchro gears cooperate with one another to prevent index plate from either advancing or retarding relative to the planetary assembly and, hence, the two rotate in the same direction and at the same speed, that is, the speed of input shaft 12. Since motion of the index plate advancing relative to planetary assembly would require opposing shaft pairs to both rotate in the same direction "counter clockwise" or in opposite direction out of synchronism, and since motion of the index plate retarding relative to planetary assembly would require opposing shaft pairs to both rotate in the same direction "clockwise" or in opposite direction out of synchronism and since the synchro gear assemblies will not allow opposing shafts to rotate in the same direction or out of synchronism in opposite directions, it can be seen that the synchro assemblies drive and maintain the index plate rotation synchronous to the planetary assembly rotation while still allowing the generation of reciprocating sinusoidal epicyclic motion, as this motion is always seen as equal rotation in opposite directions at opposite shafts.

Figure 8A:
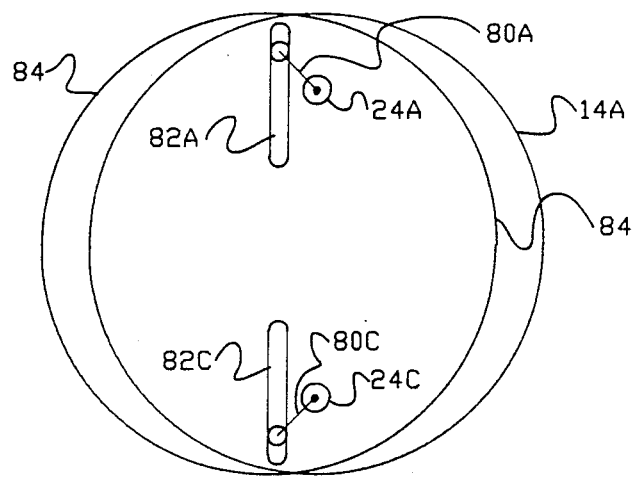
FIG. 8A is a diagrammatic illustration of the way in which particular components forming part of the overall apparatus illustrated in FIG. 1, specifically a planetary assembly and an index plate, rotate in synchronism.

As indicated previously, FIG. 8A is a diagrammatic illustration of the way in which planetary assembly 14 and index plate rotate relative to one another, assuming that the index plate is eccentric a predetermined amount with respect to the planetary assembly. In particular, FIG. 8A is intended to supplement the description immediately above in order to better explain why the combination of synchro gears 100 and synchro idler gears 102 and 104 and the crank arms 80 ensure that the index plate rotate in the same direction as and at the same speed as the planetary assembly It will be recalled from the above-discussion that the various gears only allow the cranks of opposing shaft pairs to rotate in opposite directions and in synchronism with one another. This is exemplified in FIG. 8A by means of cranks 80A and 80C which are shown at a given instant in time. Note specifically that they are moving in opposite directions, as indicated by the arrows, and they are at equidistant locations from their starting points which are generally indicated by dotted lines. Because of this movement within cooperating slots 82A and 82C, these latter slots are confined to a diametral line (across the index plate) which is always parallel to a diametral line on the planetary assembly through cooperating shafts 24A and 24C. Thus, in order to maintain that required relationship between diametral lines, the index plate must rotate at the same speed as and in the same direction as the planetary assembly In order to speed up or slow down with respect to the planetary assembly, the various gears and crank arms would have to allow the diametral lines to move out of parallelism with one another.

In an actual working prototype (one embodiment of the present invention), the planetary assembly is 7½" in diameter, the index plate is 12" in diameter, and the maximum offset (degree of eccentricity) exceeds 1". The slots 82 are 3½" long each and the cranks (from shaft to crank pin) are 1½" each. This is being provided for illustrative purposes only and this particular embodiment is contemplated in providing the maximum oscillation magnitude for waveform 48', as set forth previously.

Having described the mechanical relationship between planetary assembly 14 and shafts 24 and index plate 84 and the way in which the index plate is caused to rotate with the planetary assembly, attention is again directed to FIG. 8 for a more detailed discussion of the way in which the shafts are caused to generate the epicyclic motion described previously in conjunction with FIGS. 1–7. At the outset, it will again be assumed that shaft 12 rotates counterclockwise at a given speed, causing the planetary assembly 14 and the index plate 84 to rotate at the same speed and in the same direction. The index plate is held in an axial position, either concentric with or eccentric from the planetary assembly, by means of the index pivot 88 and its associated components, as described previously. If the index plate is concentric with the planetary assembly, then the cranks 80 of shafts 24 will not have to move within their respective slots 82 in the index plate in order to compensate for any eccentricity between the index plate and planetary assembly As a result, as stated previously, shafts 24 will not rotate at all about their own axes. On the other hand, if the index plate is placed in an eccentric position with respect to the planetary assembly, the crank arms 80A and 80B must move in opposite directions relative to their opposing crank arms 80C and 80D, respectively, in order to compensate for the eccentricity between the index plate and planetary assembly The previously described main synchro gears 100 and the synchro idler gears 102 and 104 will allow for this movement, as it is opposite and yet still maintain the rotation of index plate 84 synchronized with the planetary assembly 14. This compensating motion, as seen relative to the rotating planetary assembly, will cause one crank to advance relative to the rotating planetary assembly and will cause the opposing crank to retard relative to the rotating planetary assembly during one half of the rotational input cycle. In the other half of the cycle, the directions of rotation of the two cranks will reverse. At the halfway point of input rotation, the compensating motion present at the cranks will be zero. See for example FIGS. 2A and 2B as an illustration of this for the cranks associated with shafts 24A and 24C. This motion due to eccentric compensation present at the cranks may be described as non-uniform, i.e., pulsating and reciprocating, i.e., reversing direction. In reality, this motion present at each crank will be sinusoidal when viewed as compensating motion per input revolution. Amplitude is controlled by the degree of eccentricity, as described previously, in conjunction with the waveforms of FIGS. 2–7. As described there, because of the positional relationship between the four shafts 24 and the fact that they all orbit with the planetary assembly about its axis, they produce at their respective outputs an epicyclic motion defined by the four sinusoidal waveforms 26, 28, 32 and 34 (position) and 26', 28', 32' and 34' (speed). As also stated previously in conjunction with FIG. 1, these outputs are applied to opposing bevel gear inputs 40 and 42 forming part of overall recombination gear arrangement 38 which, as stated, is a bevel gear type of differential assembly. The way in which outputs from shafts 24 are applied to this assembly will be described below along with a detailed description of the assembly itself.

As described previously in conjunction with FIGS. 1–7, the positive half-cycle outputs of the epicyclic motion of shafts 24A and 24C successively are applied to the one input of the recombination differential assembly 38, specifically its bevel gear input 40 while simultaneously the positive half cycles of the epicyclic motion generated by shafts 24B and 24D are successively applied to the assembly's other input, specifically its bevel gear input 42 In order to accomplish this, shaft pairs 24A and 24C carry as outputs, over-running gears 106A and 106C respectively while the shaft pair 24B and 24D carry similar over-running gears 106B and 106D, respectively. For purposes of clarity, these latter gears 106B and 106D have been illustrated in FIG. 9 about the shafts 24A and 24C (as are gears 100B and 100D) so that it can be shown how they engage input gear 42 forming part of differential assembly 38. In actuality, these over-running gears (and gears 100B and 100D) are mounted on the shafts 24B and 24D, as stated, and like gears 100B and D, and 102B and D, would not be seen in FIG. 9 since their respective shafts are not shown in that Figure. Nevertheless, the way in which these over-running gears engage input gear 42 would be the same.

Referring specifically to the over-running gears 106A and 106C, it should be noted that these gears are not fixed to shafts 24A and 24C but are driven by the clockwise rotation of the shafts while allowing the shafts to counter rotate freely in a counterclockwise direction. In this regard, it should be noted that, while not shown, each over-running gear includes a standard mechanism which allows it to operate in this manner. Thus, gears 106A and 106C drive bevel gear 40 in the counterclockwise direction, as described previously. This is also true for the gears 106B and 106D. Specifically, these latter gears are driven by the clockwise rotation of their shafts 24B and 24D and allow their shafts to counterrotate freely in the counterclockwise direction, thus driving bevel gear input 42 in the counterclockwise direction. In order to apply both over-running gears 106A and 106C to bevel gear 40, an intermediate input gear 108 is provided around and fixedly connected to input bevel gear 40 so as to simultaneously engage both of the over-running gears 106A and 106C. A similar intermediate input gear 110 is fixedly connected around the input bevel gear 42 for simultaneously engaging over-running gears 106B and 106D. Referring specifically to recombination assembly 38, as stated previously, this assembly not only includes its input bevel gears 40 and 42 but also a spider 112 which serves as the output of the assembly and which is fixed to previously described intermediate output shaft 36. As described in conjunction with FIG. 1, this intermediate output shaft is located in the center of the planetary assembly 14, in line, but not connected to, input shaft 12. It is supported at one end by a bearing 113 in the support plate 16 of planetary assembly 14 and at its other end by bearing 115 in the rear axle 72 of the planetary assembly.

As described previously, the recombination assembly 38 combines the epicyclic motion from the shaft pair 24B and 24C simultaneously (in parallel) with the epicyclic motion of the shaft pair 24A and 24C to cause intermediate output shaft 36 to rotate in a continuous manner in the same direction as the input shaft 12, and at a speed that depends upon the degree of eccentricity between planetary assembly 14 and index plate 84. If the two are concentric, shaft 36 rotates at the same speed as the input shaft and if the planetary assembly and index plate are eccentric, shaft 36 rotates at a greater speed than the input shaft, depending upon the degree of eccentricity. The way in which overall combination assembly 38 accomplishes this is as follows The recombination assembly 38 is not significantly different from other differentials known in the art. The ability of a differential gear to add together two different and possibly variable inputs to provide an average dynamic output is critical to the apparatus. In this apparatus, the differential assembly 38 is used to sum the two inputs 44 and 46 (see FIGS. 4 and 5) 90° out of phase and output this sum at ½ ratio "averaging".

Again returning briefly to FIG. 1, it will be recalled that the output rotation from intermediate shaft 36 is applied to one input of epicyclic differential assembly 50 while a second input receives a fraction of input rotation Both combine to drive ultimate output shaft 58 in the opposite direction of shaft 36 (and therefore input shaft 12) and at a speed which depends on the speed of rotation of shaft 36. Specifically, as discussed previously, when shaft 36 rotates at system input RPM of shaft 12 (due to zero eccentricity), then output shaft 58 does not rotate at all. It does not start rotating unless shaft 36 is caused to rotate at a greater speed than the input RPM which requires a degree of eccentricity between index plate 84 and planetary assembly 14.

Returning to FIG. 9, intermediate output shaft 36 extends through a cooperating opening in the plate 18 of planetary assembly 14 and past rear tubular axle 72 so as to drive the ring gear input 52 to the final recombination differential assembly 50. The other input to the final recombination assembly is an input to spider 54 and the output of the assembly 50 is represented by solar gear 60 which, in turn, drives output shaft 58. The final recombination differential assembly 50 is an epicyclic configured differential with a ratio of 1:1 for solar gear 60 to the diameter of the spider pinion 116 forming part of the overall differential assembly and with a ratio of 3:1 for the ring gear 52 to the diameter of spider pinion 116. The spider input 54 is driven by a fraction of the input RPM, as stated, and this is specifically accomplished by using the planetary assembly This assembly drives the input spider by way of the take-off gear 118 fixedly mounted to tubular axle 72, a by-pass front gear 120 engaging the take-off gear and mounted to one end of a by-pass axle 122, a by-pass rear gear 124 also fixedly connected to the by-pass axle and a spider-drive gear 126 forming part of the spider input By-pass axle 122 is supported in bearings 128 and 130 in mid support plate 78 and in end support plate 132 which also supports an end of output shaft 58 by bearings 134. The ratio from the take-off gear 118 to the front by-pass gear 120 is 3:4. Therefore, the spider input 60 is driven at 75% of input rotation.

In summarizing the discussion immediately above, one input to the differential assembly 50 is provided by output shaft 36 while the other input is provided by 75% of the system input RPM, that is, 75% of the speed of input shaft 12. Because (1) the assembly 50 is an epicyclic type of differential, (2) the ratio of solar gear to spider pinion is 1:1 and (3) the ratio of ring gear to spider pinion of 3:1 and because 75% of the system's input RPM is applied to the spider input, when the ring gear input (shaft 36) is driven only at the input RPM of shaft 12, the differential assembly responds to these inputs in a way which causes the ultimate output shaft 58 not to rotate at all, as stated previously. In other words, when the ring gear rotation is 1⅓ times the spider rotation they compliment to form a closed loop and no output is present at the output shaft. On the other hand, when the ring gear input 52 (shaft 36) rotates at a greater speed than the system input RPM (due to eccentricity between the index plate and planetary assembly) and, at the same time, the spider input 54 is held at 75% of the system input RpM then the output shaft 58, by way of the solar gear 60, will rotate at speeds three times the increase of shaft 36 over system RPM because of the "3 times" relationship of ring gear to pinion verses solar gear to pinion.

The speed of output shaft 58 can be controlled by manipulating actuating rod 99. As stated previously, this actuating rod serves to vary the degree of eccentricity between the index plate 84 and planetary assembly 14. With the index plate in a starting position concentric to the planetary assembly, the output shaft 36 is caused to rotate at the same speed as input shaft 12, that is, at system input RPM, which, in turn, causes ultimate output shaft 58 not to rotate at all. As actuator rod 99 is manipulated in order to cause the index plate to become eccentric to the planetary assembly, the speed of intermediate output shaft 36 increases over and above its system input RPM in proportion to the degree of eccentricity This causes the ultimate output shaft 58 to rotate at a speed in proportion to the additional speed of shaft 36 over and above the system input RPM. Thus, by merely manipulating rod 99, the ultimate output shaft 58 can be caused to rotate continuously and substantially smoothly at a speed that is in proportion to the system input RPM without need of clutch, disengagement devices or torque converters.

Having described overall apparatus 10, it should be apparent that the primary inventive features discussed thus far have related to actual rotational output of its intermediate and final output shafts 36 and 58. More specifically, by providing what has been referred to as parallel application of epicyclic motions to the recombination differential 38, relatively smoothly rotating motion of shaft 36 is achieved as evidenced by waveforms 48 and 48'. A further feature of the overall apparatus which which is due to the parallel action just mentioned and was not discussed in detail previously relates to the way in which the apparatus shares its torque load between its four epicyclic shafts 24, as will be discussed immediately below. This is to be contrasted with prior art arrangements which utilize a serial approach (rather than a parallel approach) and which utilizes a single shaft to carry the entire torque load.

It may be recalled that, at any given time, the output from one of the shaft pairs 24A, 24C, drives one side of the recombination differential 38 while one of the other shaft pairs 24B, 24D drives the other side simultaneously. The recombination differential by its very nature requires that the two shafts simultaneously applying these motions share the torque equally. Thus, at any given moment in time, shaft 24A and shaft 24B will be sharing equally the torque load and at another time shaft 24C and shaft 24D will be sharing the loads. Again, this is to be contrasted with the serial approach in which a single shaft is providing all of the motion and hence taking up all of the torque. Thus, for any given torque transfer from, for example, input shaft 12 to, for example, intermediate shaft 26, the present invention allows the individual components, e.g., the epicyclic shafts themselves to be lighter weight than would be required if the apparatus operated serially, as in the prior art.

Figure 12:
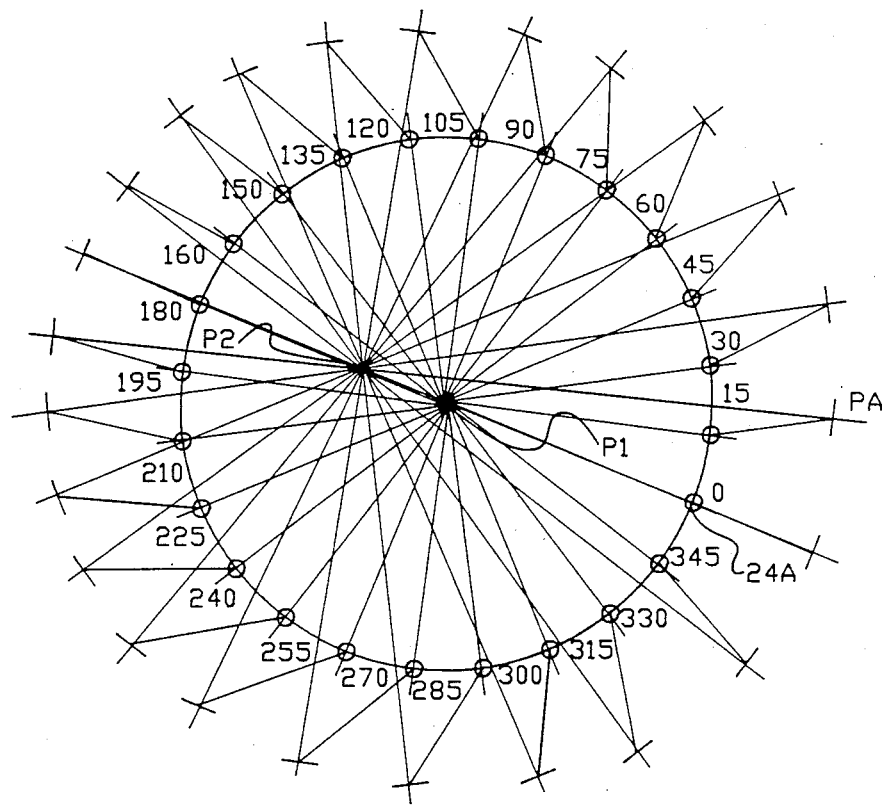
FIG. 12 diagrammatically illustrates a specific operational aspect of the apparatus illustrated in FIG. 1.

Still referring to apparatus 10, while it is believed that the foregoing discussion adequately describes the way in which the index plate 84 in combination with crank arms 80 causes shaft 24 to rotate back and forth in the manner illustrated in FIGS. 2A, 2B and FIG. 3, attention is directed to FIG. 12 for a supplemental explanation. This latter figure diagrammatically illustrates the orbital path taken by one of the shafts 24, specifically shaft 24A, and the path taken by the connecting pin of its associated crank arm 80A as the pin rides in its cooperating slot 82A. This presupposes that the index plate 84 is offset relative to the planetary assembly in the manner shown in FIG. 12. Specifically, point P1 in FIG. 12 corresponds to the center of the planetary assembly and point P2 corresponds to the eccentric center of the index plate. Note specifically that as the shaft 24A is caused to orbit about its planetary assembly path starting at 0°, moving counterclockwise, the pin of its corresponding crank arm which, for purposes of FIG. 12, will be indicated at PA, is constrained to move along its non-circular path in a way which causes the shaft 24A to first rotate about its own axis on one direction and then in the opposite direction as defined by the waveform 26 in FIG. 2A. The other three shafts 24B, C and D function in the same manner.

The following are a number of modified versions to overall apparatus 10 described previously. The first of these modified versions is illustrated in FIG. 13 and is directed to the specific way in which the index plate can be moved between its concentric position with the planetary assembly and various eccentric positions. In this regard, while the index plate illustrated is a modified index plate 200 to be described hereinafter, the previously described index plate 84 can be moved between its concentric and eccentric positions in the same manner. An index plate positioning arrangement is shown at 202 and includes an index plate support arm assembly 204 which supports index plate 200 for rotation at a point between its opposite ends by suitable means generally indicated at 206. One end of assembly 204 is pivotally connected to a fixed support member 208 by means of an index plate pivot pin 210 such that the entire arm assembly and index plate are pivotally movable back and forth about pin 210, as indicated by arrow 212.

Still referring to FIG. 13, an assembly 214 is provided for moving the otherwise free end of index plate arm assembly 204 vertically upward and downward in a controlled manner, as indicated by arrow 216. This, in turn, causes the arm assembly to pivot about pin 210, thereby moving the index plate in the arcuate fashion just described between a concentric position with its adjacent to the planetary assembly and various eccentric positions. The assembly 214 is comprised of a support housing 218 for containing an index plate positioning screw 219 which is threaded through an index plate positioning nut 221 fixed in place in the support housing. The top end of the screw 220 is connected to a suitable motor 223 which rotates the screw either clockwise or counterclockwise in response to outside control signals. By rotating the screw in one direction, it moves vertically upward and by rotating it in the opposite direction it moves vertically downward in the direction of arrow 216. This screw is suitably connected to the otherwise free end of arm assembly 204 to cause the latter to move upward and downward with it, in the manner described previously. In that way, by providing specific control signals to motor 223, the index plate 200 can be moved in a controlled manner between its concentric position with the planetary assembly and various eccentric positions, thereby ultimately controlling the speed of previously described intermediate shaft 36 and output shaft 58.

Attention is now directed to FIGS. 14–19 for a discussion of a modified version of apparatus 10. It may be recalled that, for the apparatus to operate in the manner described, its planetary assembly and index plate must rotate in the same direction and at the same speed whether they are concentric or eccentric with one another. In apparatus 10, as described previously, this was accomplished by means of the synchro gears 100 in combination with synchro idler gears 102 and 104. In FIGS. 14–19, there is illustrated a modified arrangement of components that eliminates the need for these synchro gears and synchro idler gears while at the same time insuring that the planetary assembly and index plate of the apparatus rotate in the same direction and at the same speed As will be seen below, to accomplish this, the modified planetary assembly and a modified index plate are utilized.

Figure 15:
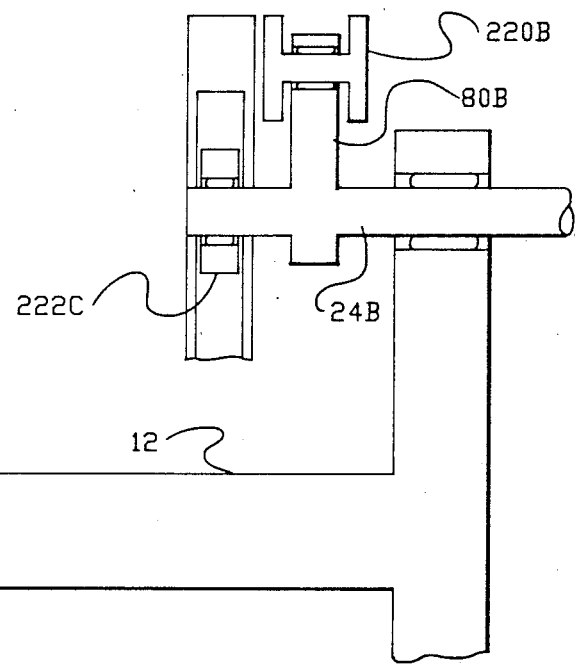
FIG. 15 is a sectional view taken generally along lines 15—15 in FIG. 14.
Figure 16:
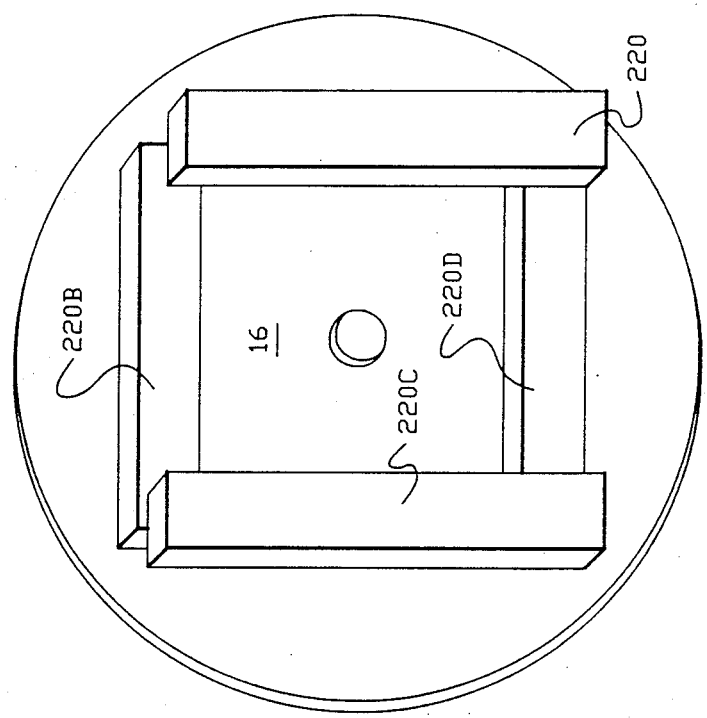
FIG. 16 is a perspective view of the arrangement illustrated in FIG. 14, with certain components omitted for purposes of clarity.

Turning first to FIGS. 14, 15 and 16, a modified planetary assembly 14' is illustrated. As illustrated best in FIG. 14, this planetary assembly includes the previously described epicyclic motion generating shafts 24A, 24B, 24C and 24D extending out beyond plate 16 in the same manner illustrated in, for example FIG. 11A. The previously described crank arms 80A, 80B, 80C and 80D are respectively connected to these shafts in the manner illustrated in FIG. 9 and FIG. 14. However, these crank arms are not interconnected into slots in the index plate as they are illustrated in FIGS. 8 and 9. Rather, each is connected near one end of an associated motion bar 220A, 220B, 220C or 220D. At the same time, each shaft 24 carries a freely rotating idler arm 222A, 222B, 222C or 222D. In this regard, note that the idler arm 222A is mounted to the shaft 24D, the idler arm 222D is mounted to the shaft 224C and so one, as shown in FIG. 14. Also note that the idler arm 222A is connected near the otherwise free end of motion bar 220A, the idler arm 222B is connected near the otherwise free end of motion bar 220B, and so on. It is important to note that each crank arm 80A and its associated idler arm 222A are pivotally connected to motion bar 220A in such a way that the motion bar is constrained to always move parallel to the line connecting the centers of shafts 24A and 24D. This is also true with the other crank and idler arms. Thus, motion bar 220B can only move parallel to the line intersecting shafts 24A and 24B; motion bar 220C can only move parallel to the line intersecting shaft 24B and 24C; and, finally, motion bar 220D can move only parallel to the line intersecting shafts 24C and 24D. As will be seen below, these motion bars are constrained within sliding guides in a modified index plate so as to impart the previously described epicyclic motion to shafts 24 (as depicted in FIGS. 2A and 2B) and so as to insure that index plate rotates in the same direction and at the same speed as the planetary assembly. For purposes of illustration, end plate 16 and motion bars 220 are shown in FIG. 16 without the crank and idler arms.

Figure 17:
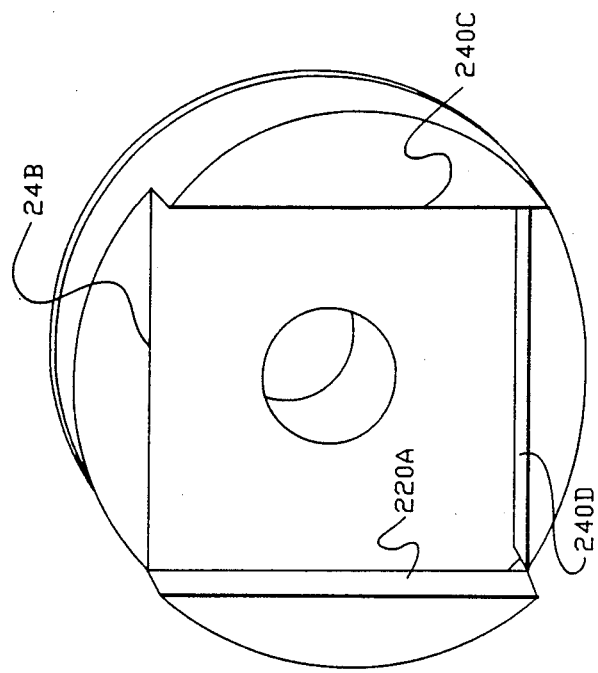
FIG. 17 is a perspective view of a modified index plate forming part of the apparatus of FIG. 1 and designed to cooperate with the arrangement illustrated in FIG. 14.

Referring to FIGS. 17–19, attention is now directed to the modified index plate referred to above. This index plate is generally indicated by the reference numeral 200, as mentioned previously in connection with FIG. 13. Note specifically that the internal side of the index plate, that is, the side facing end plate 16 of planetary assembly 14' and the associated motion bars 220, includes a recessed section 230 surrounded by four bilevel outer sections 232, 234, 236 and 238. These various outer sections combine to provide sliding guides 240A, 240B, 240C, and 240D for receiving the motion bars 220A, 220B, 220C and 220D, respectively. The motion bars are actually shown in place in FIG. 19. Note specifically that the sliding guides allow the motion bars to slide back and forth laterally, that is, normal to their longitudinal axis, with respect to the index plate. At the same time, the motion bars are prevented from moving longitudinally or angularly relative to the index plate. In any event, the motion bars interlock the index plate for movement with the rotating assembly in the same direction and at the same speed.

Having described the modified planetary assembly 14, and the modified index plate 200, attention is directed to the way they cooperate with one another to insure that the shafts 24 move in the epicyclic manner described previously while, at the same time, insuring that the planetary assembly and index plate are synchronized in speed and direction. Assuming that the index plate and planetary assemblies are concentric to one another, the motion bars do not have to move at all relative to the index plate for the two to move together in the same direction and at the same speed and, hence, the shafts will not rotate at all. On the other hand, when the index plate and planetary assembly are eccentric with respect to one another, each crank arm pin connected to its associated motion bar will follow the path illustrated in FIG. 12. This will force the motion arms to move longitudinally and laterally while retaining the parallel relationship described previously. Since the motion bars cannot move longitudinally or angularly with respect to the index plate they will force the index plate to move with them in the same direction and at the same speed as the planetary assembly At the same time, this movement of the motion bars cause their respective shafts 24 to rotate back and forth in accordance with the waveforms 26, 28, 32 and 34 in FIGS. 2A, 2B and 3.

Incorporating the modified versions of apparatus 10, as described immediately above, main synchro gears 100 and synchro idler gears 102 and 104 are eliminated from the apparatus. In providing a further modification to be described in conjunction with FIGS. 20 and 21 below, the previously described over-running gears 106 and the intermediate input gears 108 and 110 can be eliminated. In this regard, it may be recalled that the over-running gears 106A and 106C alternatively drive gear 108 in the clockwise direction only as shafts 24A and 24C rotate in the counterclockwise direction and free wheel when the shafts rotate in the opposite direction. This is also true for over-running gears 106B and 106D and their associated immediate input gear 110.

Turning now to FIGS. 20 and 21, the shafts 24A–D are illustrated in conjunction with input shaft 12 and intermediate output shaft 36. There is also shown, a modified recombination gear arrangement 38' which may be identical or substantially identical to gear arrangement 38, except that it is not driven by over-running gears 106 and intermediate input gears 108 and 110. Rather, as will be seen below, a combination of links and over-running clutches are utilized. In that regard, note that arrangement 38' includes one input shaft 310 and an opposite hollow input shaft 312.

As illustrated best in FIG. 21, each of the shafts 24 includes opposing fixed links or rocker arms 300 and 302 connected to interconnecting links 304 in the manner illustrated. These latter links 304 are connected to respective over-running clutches 306. More specifically, the shaft 24A is connected through its links 300A, 302A and 304A to an over-running clutch 306A, the shaft 24B is connected through its links 300B, 302B and 304B to its associated over-running clutch 306B and so on, as stated previously. The over-running clutches 306A and 306C are mounted around shaft 312 and the clutches 306B and 306D are mounted around shaft 310.

Each of the shafts 24 rotates clockwise and then counterclockwise. As, for example, shaft 24 rotates counterclockwise, its links cause the over-running clutch 306A to drive shaft 312 in the same direction. As shaft 24A rotates clockwise, the links cause the same over-running clutch to free wheel in the opposite direction. This is true for the various other shafts 24, their links and their over-running clutches In FIG. 20, only the shafts 24A and 24D are shown along with their connected over-running clutches While the other two over-running clutches 306C and B are shown, they are not shown connected to their shafts In any event, it should be noted that the over-running clutches 306B and 306D alternatively drive input shaft 310 to the recombination assembly 38' while the over-running clutches 306A and 306C alternatively drive the hollow input shaft 312 to the recombination assembly on its opposite side Note specifically that the output shaft 36 is supported within a bearing system 314 within the shaft 312.

From the description of FIGS. 20 and it should be clear that the inputs to the opposite sides of recombination assembly 38' correspond to those described in FIG. 9 without the need for gears 106 and 108. Thus, when incorporating the modifications of FIGS. 20 and 21, with the modifications of FIGS. 14–19 in apparatus 10, it can be seen that all of the gears 100, 102, 104, 106, 108 and 110 are eliminated.

What is claimed is:

1. An apparatus for modifying an input rotation to produce a modified rotational output, comprising:
   (a) means for establishing said input rotation;
   (b) first means responsive solely to and synchronized with said input rotation for producing a first intermediate rotation which varies in speed in accordance with a first specific waveform at a particular peak amplitude corresponding to the maximum speed of said intermediate rotation;
   (c) second means responsive solely to and synchronized with said input rotation for producing a second intermediate rotation which varies in speed in accordance with a second specific waveform identical to but 90degrees out of phase with said first waveform; and
   (d) means for simultaneously coupling said first and second intermediate rotations to an output shaft in a way which causes said shaft to rotate and thereby provide a rotational output, said coupling means being designed to average said intermediate rotations such that said rotational output is an output which corresponds in speed to the average of said first and second sinusoidal waveforms, whereby the speed of said output shaft depends upon the amplitude of said waveforms;
   (e) said input rotation and said intermediate rotations being in the same direction and wherein each of said intermediate rotations vary in speed between a minimum speed equal to said input rotation and a maximum speed exceeding said input rotation;
   (f) said first intermediate rotation producing means including
      (i) first means for generating first epicyclic motion consisting of an orbital component in the same direction and at the same speed as said input rotation, and a reciprocating component first increasing then decreasing in speed in the same direction as said orbital component during a first half-cycle of said orbital component and thereafter increasing and then decreasing in speed in the opposite direction during the second half-cycle of said orbital component, in accordance with a particular waveform,
      (ii) second means for generating second epicyclic motion identical to said first epicyclic motion, except that its reciprocating component is 180° out of phase with the reciprocating component of said first epicyclic motion, and
      (iii) means for converting said first and second epicyclic motions to said first intermediate rotation; and
   (g) said second intermediate rotation producing means including
      (i) third means for generating third epicyclic motion identical to said first and second epicyclic motions except that its reciprocating component is 90° out of phase with the reciprocating components of said first and second epicyclic motion,
      (ii) fourth means for generating fourth epicyclic motion identical with said first, second and third epicyclic motions, except that its reciprocating component is 180° out of phase with the reciprocating component of said third epicyclic motion and 90° out of phase with said first and second epicyclic motions; and
      (iii) means for converting said third and fourth epicyclic motions to said intermediate rotation.

2. An apparatus according to claim 1 including means for changing the maximum speed of said intermediate rotations from a speed equal to the input rotation, such that the amplitude of said waveforms is zero, to a predetermined speed greater than the input rotation such that the peak amplitude of said waveforms is greater than zero, whereby the speed of said rotational output can be varied from a speed equal to said input rotation to a predetermined higher speed.

3. An apparatus according to claim 1 wherein said first, second, third and fourth means for generating epicyclic motion include:
   (a) common plate means mounted for rotation about an axis concentric with said input rotation;
   (b) means coupling said input rotation with said common plate means for rotating the latter at the same speed and in the same direction as said input rotation;
   (c) first, second, third, and fourth shaft means corresponding to said first, second, third and fourth epicyclic motions, respectively, mounted to said common plate means in parallel relationship with and equally circumferentially spaced about the axis of the common plate means such that said first and second shaft means are opposite one another and said third and fourth shaft means are opposite one another, each of said shaft means being mounted for rotation with said common plate means, whereby to provide the orbital component of its epicyclic motion, and also being mounted to said common plate means for rotation about its own axis; and
   (d) means separate from said common plate means for imparting to each of said shaft means the reciprocating component of its epicyclic motion.

4. An apparatus according to claim 3 wherein said separate means for imparting to each of said shaft means the reciprocating component of its epicyclic motion includes:

(a) index plate means in parallel relationship to and mounted for rotation with said common plate means about its own axis;

(b) means for varying the position of said index plate means relative to said common plate means such that the two can be made to be concentric with one another or eccentric to varying degrees, said position varying means serving as said means for changing the maximum speed of said intermediate rotation;

(c) first, second, third and fourth sliding guides in said index plate means; and (d) first, second, third, and fourth motion bar arrangements, each coupling an end of a respective one of said shaft means to a corresponding one of said sliding guides, said motion bar arrangements and sliding guides cooperating with one another so as to cause said index plate means to rotate in the same direction and at the same speed as said common plate means.

5. An apparatus according to claim 4 wherein each of said motion bar arrangements include a single motion bar, crank means connected to one of said shafts and one end of its motion bar and idler arm means connected to an adjacent shaft and the other end of that motion bar.

6. An apparatus according to claim 1 wherein said means for converting said first and second epicyclic motions to said first intermediate rotation includes a combination of rocker arms, links and over-running clutches and wherein said means for converting said third and fourth epicyclic motions to said intermediate rotation includes a combination of rocker arms, links and over-running clutches.

7. An apparatus for modifying an input rotation to produce a modified rotational output, comprising:

(a) means for establishing said input rotation;

(b) first means for generating solely from said input rotation a first epicyclic motion consisting of an orbital component rotating in the same direction and at the same speed as said input rotation and a rotational component;

(c) second means for generating solely from said input rotation a second epicyclic motion consisting of an orbital component and a rotational component, said second epicyclic motion being identical to said first epicyclic motion, except that the rotational component of said second epicyclic motion is out of phase with the sinusoidal rotational component of said first epicyclic motion by 90 degrees; and (d) means for simultaneously coupling said first and second epicyclic motions to an output shaft in a way which causes the shaft to rotate and thereby provide a rotational output, said coupling means being designed to average the rotational components of said first and second epicyclic motions such that the rotational output is an output which exceeds the speed of the orbital component of each of said epicyclic motions and therefore exceeds the speed of said input rotation by an amount which is the average of their rotational components.

8. An apparatus according to claim 7 including a second output shaft and means for combining the rotation of said first mentioned output shaft with a rotation corresponding to a certain percentage of said input rotation in a way which causes the second output shaft to rotate only if the speed of said first mentioned output shaft exceeds said input rotation and only at a speed which is directly proportionate to that excess.

9. A method of modifying an input rotation to produce a modified rotational output, comprising the step of:

(a) establishing said input rotation;

(b) producing solely from said input rotation a first intermediate rotation which varies in speed in accordance with a first specific waveform at a particular peak amplitude corresponding to the maximum speed of said intermediate rotation, said first intermediate rotation varying in speed between a minimum speed equal to said input rotation and a maximum speed exceeding said input rotation;

(c) producing solely from said input rotation a second intermediate rotation which varies in speed in accordance with a second waveform identical to but 90 degrees out of phase with said first waveform;

(d) simultaneously coupling said first and second intermediate rotations to an output shaft to cause said shaft to rotate and thereby provide a rotational output, said coupling step being provided in a way which averages said intermediate rotations such that said rotational output is a substantially smooth output corresponding in speed to the average of said first and second waveforms, whereby the speed of said output shaft depends upon the peak amplitude of said waveforms.

10. A method according to claim 9 including the step of changing the maximum speed of said intermediate rotations from the speed equal to the input rotation, whereby the peak amplitude of said waveforms is zero, to a predetermined speed greater than the input rotation, whereby the peak amplitude of said waveforms is greater than zero and whereby the speed of said rotational output can be varied from a speed equal to said input rotation to a predetermined higher speed.

11. A method according to claim 9 including the steps of combining said rotational output with a certain fraction of said input rotation in a way which causes a second output shaft to rotate only if the speed of said first-mentioned output shaft exceeds said input rotation and only at a speed which is directly proportionate to the difference in speed between said first-mentioned output shaft and said input rotation.

12. A method of modifying an input rotation to produce a modified rotational output, comprising:

(a) establishing said input rotation;

(b) generating solely from said input rotation a first epicyclic motion consisting of an orbital component rotating in the same direction and at the same speed as said input rotation and a rotational component;

(c) generating solely from said input rotation a second epicyclic motion consisting of an orbital component and a rotational component, said second epicyclic motion being identical to said first epicyclic motion, except that the rotational component of said second epicyclic motion is out of phase with the rotational component of said first epicyclic motion by 90°; and (d) simultaneously coupling said first and second epicyclic motions to an output shaft in a way which causes the shaft to rotate and thereby provide a rotational output, said coupling step serving to average the rotational components of said first and second epicyclic motions such that the rotational output is a substantially smooth output which exceeds the speed of the orbital component of each of said epicyclic motions and therefore exceeds the speed of said input rotation by an amount which is the average of their rotational components.

13. A method according to claim 12 including the step of combining the rotation of said output shaft with a rotation corresponding to a certain percentage of said input rotation in a way which causes a second output shaft to rotate only at the speed of said first mentioned output shaft when it exceeds said input rotation and only at a speed which is directly proportionate to that excess.

14. An epicyclic motion generating arrangement, comprising:
 (a) means for generating an input rotation at a certain speed and in a certain direction;
 (b) means supporting a planetary assembly for rotation about its own axis in response to and synchronism with said input rotation such that said planetary assembly rotates at the same speed and in the same direction as said input rotation, said planetary assembly including first and second shafts supported for back and forth rotation about their own axes and positioned equidistant from and on opposite sides of the axis of said planetary assembly, whereby rotation of the planetary assembly in the direction and at the speed of said input rotation imparts to said first and second shafts an orbiting component of epicyclic motion about the axis of the planetary assembly in the same direction and at the speed of said input rotation;
 (c) means supporting an index plate for rotation about its own stationary axis parallel with the axis of said planetary assembly, said index plate including first and second slots positioned equidistant from and on opposite sides of the axis of the index plate;
 (d) means for moving said index plate to a limited extent normal to its axis of rotation between a first stationary position concentric with said planetary assembly and a second stationary position eccentric to said planetary assembly to varying degrees;
 (e) first and second crank means fixedly connected to common ends of said first and second shafts, respectively, and disposed within said first and second slots, respectively; and
 (f) means for coupling said index plate to said planetary assembly in a way which causes said index plate to rotate in the same direction and at the same speed as said planetary assembly whether the index plate is concentric with or eccentric to said planetary assembly, whereby, when the index plate is eccentric to the planetary assembly, it causes said first shaft to reciprocate about its own axis, first increasing then decreasing in speed in the same direction as its orbital component during a first half cycle of said orbital component and thereafter increasing and then decreasing in speed in the opposite direction during the second half-cycle of the orbital component and whereby it causes said second shaft to reciprocate in a like manner, except 180 degrees out of phase with the reciprocating motion of said first shaft, said reciprocating motion of each shaft serving as a reciprocating component of its overall epicyclic motion.

15. An apparatus according to claim 14 wherein said means for coupling said index plate for rotation with said planetary assembly includes gear means interconnecting said first and second shafts such that said first and second cranks can only rotate in opposite directions to one another.

16. An apparatus according to claim 15 wherein said means including said planetary assembly includes third and forth shafts corresponding in function to said first and second shafts but located on opposite sides of and equidistant from the axis of the planetary assembly and equidistant from the first and second shafts, wherein said index plate includes third and forth slots corresponding in function to said first and second slots, and wherein the planetary assembly includes third and forth crank means fixedly connected to common ends of said third and forth shafts and disposed in said third and forth slots, respectively, whereby said third and forth shafts generate the same epicyclic motion as said first and second shafts with their reciprocating components being 180 degrees out of phase with one another and 90 degrees out of phase with the reciprocating components of said first and second shafts.

17. An apparatus for modifying an input rotation in continuously variable increments to produce a rotational output, said apparatus comprising:
 an input rotation shaft operatively connected to a power generating apparatus for rotation of said input shaft at an input rpm;
 a planetary assembly operatively connected to said input rotation shaft for rotation of said planetary assembly at said input rpm;
 a plurality of planetary offset shafts carried by and arranged radially and concentrically with respect to said planetary assembly, whereby to cause said offset shafts to orbit at said input rpm;
 means acting on said planetary offset shafts for causing each of said planetary offset shafts to rotate about its central longitudinal axis in a sinusoidal rotational motion in response to and solely as a result of said input rpm; and
 a processing assembly for combining said sinusoidal rotational motions in a predetermined way and then processing said combined rotational motion in a parallel fashion to produce a modified rotational output.

18. An apparatus according to claim 17, comprising a first pair of opposed planetary offset shafts and a second pair of opposed planetary offset shafts.

19. An apparatus according to claim 18, wherein said processing assembly includes a recombination differential gear assembly operatively engaged with said planetary offset shafts.

20. An apparatus according to claim 17, wherein said means for generating said sinusoidal rotational motions of said planetary offset shafts comprises a means for generating epicyclic motion.

21. A method of modifying an input rotation to produce a modified substantially smooth rotational output, comprising the steps of:
 (a) establishing said input rotation;
 (b) producing solely from said input rotation a first intermediate rotation which varies in speed in accordance with a first specific waveform defined by the like half-cycles of a sinusoidal waveform at a particular peak amplitude corresponding to the maximum speed of said intermediate rotation said input rotation and said intermediate rotations being in the same direction and each of said intermediate rotations varying in speed between a minimum speed equal to said input rotation and a maximum speed exceeding said input rotation;

(c) producing solely from said input rotation a second intermediate rotation which varies in speed in accordance with a second waveform identical to but 90 degrees out of phase with said first waveform;

(d) simultaneously coupling said first and second intermediate rotations to an output shaft to cause said shaft to rotate and thereby provide a rotational output, said coupling step being provided in a way which averages said intermediate rotations such that said rotational output is a substantially smooth output corresponding in speed to the average of said first and second waves, whereby the speed of said output shaft depends upon the peak amplitude of said waveforms; and (e) changing the maximum speed of said intermediate rotations from a speed equal to the input rotation, whereby the peak amplitude of said waveforms is zero, to a predetermined speed greater than the input rotation, whereby the peak amplitude of said waveforms is greater than zero and whereby the speed of said uniform rotational output can be varied from a speed equal to said input rotation to a predetermined higher speed.

22. An epicyclic motion generating arrangement, comprising:

(a) means for generating an input rotation at a certain speed and in a certain direction;

(b) means supporting a planetary assembly for rotation about its own axis at the same speed and in the same direction as said input rotation, said planetary assembly including first and second shafts supported for back and forth rotation about their own axes and positioned equidistant from and on opposite sides of said planetary assembly, whereby rotation of the planetary assembly in the direction and at the speed of said input rotation imparts to said first and second shafts an orbiting component of epicyclic motion about the axis of the planetary assembly in the same direction and at the speed of said input rotation;

(c) means supporting an index plate for rotation about its own axis parallel with the axis of said planetary assembly, said index plate including first and second sliding guides positioned on opposite sides of the axis of the index plate;

(d) means for moving said index plate to a limited extent normal to its axis of rotation between a first position concentric with said planetary assembly and a second position eccentric to said planetary assembly to varying degrees;

(e) first and second motion bar arrangements fixedly connected to common ends of said first and second shafts, respectively, and disposed within said first and second sliding guides, respectively, said motion bar arrangements coupling said index plate to said planetary assembly in a way which causes said index plate to rotate in the same direction and at the same speed as said planetary assembly whether the index plate is concentric with or eccentric to said planetary assembly, whereby, when the index plate is eccentric to the planetary assembly, it causes said first shaft to reciprocate about its own axis, first increasing then decreasing in speed in the same direction as its orbital component during a first half cycle of said orbital component and thereafter increasing and then decreasing in speed in the opposite direction during the second half cycle of the orbital component, and whereby it causes said second shaft to reciprocate in a like manner, except 180° out of phase with the reciprocating motion of said first shaft, said reciprocating motion of each shaft serving as a reciprocating component of its overall epicyclic motion.

23. An apparatus according to claim 22 wherein said means supporting said planetary assembly includes third and fourth shafts supported for back and forth rotation about their own axis positioned equidistant from and on opposite sides of the axis of said planetary assembly 90° out of phase with said first and second shafts, said index plate including third and forth sliding guides positioned on opposite sides of the axis of the index plate 90° out of phase with said first and second sliding guides, said epicyclic motion generating arrangement also including third and forth motion bar arrangements fixedly connected to common ends of said third and forth shafts, respectively, and disposed within said third and forth sliding guides, respectively, such that the third and forth shafts reciprocate in the same manner as said first and second shafts when the index plate is eccentric to the planetary assembly, but 90° out of phase with said first and second shafts and 180° out of phase with one another.

24. An arrangement according to claim 23 wherein each of said motion bar arrangements includes a motion bar, crank means connected to an associated one of said shafts and one end of its associated motion bar and idler arm means connected to an adjacent shaft and to an opposite end of the associated motion bar.

25. An apparatus for modifying an input rotation to produce a modified rotational output, comprising:

(a) means for establishing said input rotation;

(b) first means responsive to said input rotation for producing a first intermediate rotation which varies in speed in accordance with a first specific waveform at a particular peak amplitude corresponding to the maximum speed of said intermediate rotation;

(c) second means responsive to said input rotation for producing a second intermediate rotation which varies in speed in accordance with a second specific waveform identical to but 90 degrees out of phase with said first waveform; and (d) means for simultaneously coupling said first and second intermediate rotations to an output shaft in a way which causes said shaft to rotate and thereby provide a rotational output, said coupling means being designed to average said intermediate rotations such that said rotational output is an output which corresponds in speed to the average of said first and second waveforms, whereby the speed of said output shaft depends upon the amplitude of said waveforms;

(e) said input rotation and said intermediate rotations rotating in the same direction and each of said intermediate rotations varying in speed between a minimum speed equal to said input rotation and a maximum speed exceeding said input rotation;

(f) means for changing the maximum speed of said intermediate rotations from a speed equal to the input rotation, such that the amplitude of said waveforms is zero, to a predetermined speed greater than the input rotation such that the peak amplitude of said waveforms is greater than zero, whereby the speed of said rotational output can be varied from a speed equal to said input rotation to a predetermined higher speed;

(g) said first intermediate rotation producing means including
  (i) first means for generating first epicyclic motion consisting of an orbital component in the same direction and at the same speed as said input rotation, and a reciprocating component first increasing and then decreasing in speed in the same direction as said orbital component during a first half-cycle of said orbital component and thereafter increasing and then decreasing in speed in the opposite direction during the second half-cycle of said orbital component, in accordance with a particular waveform,
  (ii) second means for generating second epicyclic motion identical to said first epicyclic motion, except that its reciprocating component is 180° out of phase with the reciprocating component of said first epicyclic motion, and
  (iii) means for converting said first and second epicyclic motions to said first intermediate rotation;
(h) said second intermediate rotation producing means including
  (i) third means for generating third epicyclic motion identical to said first and second epicyclic motions except that its reciprocating component is 90° out of phase with the reciprocating components of said first and second epicyclic motion,
  (ii) fourth means for generating fourth epicyclic motion identical to said first, second and third epicyclic motions, except that its reciprocating component is 180° out of phase with the reciprocating component of said third epicyclic motion and 90° out of phase with said first and second epicyclic motions; and
  (iii) means for converting said third and fourth epicyclic motions to said second intermediate rotation;
(i) said first, second, third and fourth means for generating epicyclic motion including
  (i) a common plate arrangement mounted for rotation about an axis concentric with said input rotation,
  (ii) means coupling said input rotation with said common plate arrangement for rotating the latter at the same speed and in the same direction as said input rotation,
  (iii) first, second, third and fourth shafts corresponding to said first, second, third and fourth epicyclic motions, respectively, mounted to said common plate arrangement in parallel relationship with and equally circumferentially spaced about the axis of the common plate arrangement such that said first and second shafts are opposite one another and said third and fourth shafts are opposite one another, each of said shafts being mounted for rotation with said common plate arrangement, whereby to provide the orbital component of its epicyclic motion, and also being mounted to said common plate means for rotation about its own axis, and
  (iv) means separate from said common plate means for imparting to each of said shafts the reciprocating component of its epicyclic motion; and
(j) said separate means for imparting to each of said shafts the reciprocating component of its epicyclic motion including
  (i) an index plate in parallel relationship to and mounted for rotation with said common plate arrangement about its own axis,
  (ii) means for varying the position of said index plate relative to said common plate arrangement such that the two can be made to be concentric with one another or eccentric to varying degrees, said position varying means serving as said means for changing the maximum speed of said intermediate rotations,
  (iii) means for coupling an end of each of said shafts to a corresponding segment of said index plate, and
  (iv) synchronizing means interconnecting said common plate arrangement with said index plate so as to cause said index plate to rotate in the same direction and at the same speed as said common plate arrangement, and, therefore, at said input rotation.

26. An apparatus according to claim 25 wherein said means for varying the position of said index plate relative to said common plate arrangement such that the two can be made concentric with one another or eccentric to varying degrees includes:
  (a) an index pivot fixedly connected with said index plate;
  (b) means supporting said index pivot for pivotal movement about an axis parallel with but spaced laterally to one side of the axis of said index plate, whereby said index plate and said index pivot are eccentric to one another and whereby pivotal movement of said index pivot causes said index plate to move with it between a position concentric with said common plate arrangement and eccentric to varying degrees to said common plate arrangement.

27. An apparatus according to claim 25 including a second output shaft and means combining the rotation of said first-mentioned output shaft with rotation corresponding to a certain percentage of said input rotation in a way which causes said second output shaft to rotate only if the speed of said first-mentioned output shaft exceeds said input rotation and only at a speed which is directly proportionate to the difference in speed between said first-mentioned output shaft and said input rotation.

28. An apparatus according to claim 25 wherein said index plate includes first, second, third and fourth slots and wherein said means for coupling an end of each shaft to said index plate includes a crank arrangement for coupling an end of each of said shafts to a corresponding one of said slots.

29. An apparatus according to claim 28 wherein said synchronizing means includes a series of gear means interconnecting said four shafts such that the crank means of said first and second shaft means can only rotate in opposite direction to one another and such that the crank mean of said third and fourth shaft means can only rotate in opposite directions to one another, whereby to prevent said index plate means from either rotating faster than or slower than said common plate means.

30. An apparatus for modifying an input rotation in continuously variable increments to produce a rotational output, said apparatus comprising:
  an input rotation shaft operatively connected to a power generating apparatus for rotation of said input shaft at an input rpm;

a planetary assembly operatively connected to said input rotation shaft for rotation of said planetary assembly at said input rpm;

a plurality of planetary offset shafts arranged radially and concentrically with respect to said planetary assembly, said offset shafts including a first pair of opposed shafts and a second pair of opposed shafts means for rotating each of said planetary offset shafts about its central longitudinal axis in a sinusoidal rotation motion; and a processing assembly for combining said sinusoidal rotational motions in a predetermined way and then processing said combined rotational motions in a parallel fashion to produce a modified substantially smooth rotational output;

said processing assembly including a recombination differential gear assembly operatively engaged with said planetary offset shafts, and at least one overrunning gear mounted on each of said planetary offset shafts, each of said overrunning gears being operatively engaged with said recombination differential gear assembly.

31. An apparatus according to claim 30, wherein said processing assembly includes means for applying corresponding half-cycles of said sinusoidal rotational motions of said planetary offset shafts as inputs to said recombination differential gear assembly.

32. An apparatus according to claim 30, wherein said overrunning gears mounted on said first opposed pairs of planetary offset shafts are operatively engaged to a first input gear of said recombination differential gear assembly and said overrunning gears mounted on said second opposed pair of planetary offset shafts are operatively engaged to a second input gear of said recombination differential gear assembly.

33. An apparatus according to claim 32, wherein said recombination differential gear assembly is a bevel-gear differential gear assembly.

34. An apparatus for modifying an input rotation in continuously variable increments to produce a rotational output, said apparatus comprising:

an input rotation shaft operatively connected to a power generating apparatus for rotation of said input shaft at an input rpm;

a planetary assembly operatively connected to said input rotation shaft for rotation of said planetary assembly at said input rpm;

a plurality of planetary offset shafts arranged radially and concentrically with respect to said planetary assembly;

means for rotating each of said planetary offset shafts about its central longitudinal axis in a sinusoidal rotational motion said rotating means including means for generating epicyclic motion, said means for generating epicyclic motion including an index plate assembly which is adjustable from an alignment which is concentric with respect to said planetary assembly in continuous increments through a variety of eccentric alignments; and a processing assembly for combining said sinusoidal rotational motions in a predetermined way and then processing said combined rotational motions in a parallel fashion to produce a modified substantially smooth rotational output.

35. An apparatus according to claim 34, wherein said index plate assembly is provided with a plurality of radially arranged slots, and each of said planetary offset shafts is operatively connected to a rotatable crank arm assembly having a crank pin engaged in one of said slots in said index plate assembly.

36. An apparatus according to claim 35, additionally comprising a first synchronization gear assembly operatively engaged with said first opposed pair of planetary offset shafts and a second synchronization gear assembly operatively engaged with said second opposed pair of planetary offset shafts.

37. An apparatus according to claim 36, wherein said first and second synchronization gear assemblies each comprise primary synchronization gears rigidly mounted on each of said planetary offset shafts and a pair of synchronization idler gears rotatably engaged with each of said primary synchronization gears, with each pair of synchronization idler gears rotatably engaged with corresponding pair of synchronization idler gears.

38. An apparatus for modifying an input rotation in continuously variable increments to produce a rotational output, said apparatus comprising:

an input rotation shaft operatively connected to a power generating apparatus for rotation of said input shaft at an input rpm;

a planetary assembly operatively connected to said input rotation shaft for rotation of said planetary assembly at said input rpm;

a plurality of planetary offset shafts arranged radially and concentrically with respect to said planetary assembly;

means for rotating each of said planetary offset shafts about its central longitudinal axis in a sinusoidal rotational motion;

a processing assembly for combining said sinusoidal rotational motions in a predetermined way and then processing said combined rotational motions in a parallel fashion to produce a modified substantially smooth output; and means for further processing said modified rotational output to produce a final rotational output.

39. An apparatus according to claim 38, wherein said means for further processing said modified uniform rotational output includes a final recombination differential gear assembly, and an intermediate shaft expressing said modified rotational output, said intermediate output shaft being operatively engaged with a first input gear of said final recombination differential gear assembly.

40. An apparatus according to claim 39, wherein said final recombination differential gear assembly is an epicyclic-type differential gear assembly.

41. An apparatus according to claim 40, additionally comprising a take-off gear mounted to said planetary assembly whereby said take-off gear is rotated at the input rpm, said take-off gear operatively engaged with a second input gear of said final recombination gear assembly.

42. An apparatus according to claim 41, additionally comprising means for modifying the rotation of said take-off gear operatively connected between said planetary assembly and said final recombination differential gear assembly.

43. An apparatus according to claim 42, wherein said means for modifying the rotation of said take-off gear includes gear reduction means reducing the rotational rate at said second input gear of said final recombination differential gear assembly.

44. An epicyclic motion generating arrangement, comprising:

(a) means for generating an output rotation at a certain speed and in a certain direction;
(b) means supporting a planetary assembly for rotation about its own axis in response to and in synchronism with said input rotation such that said planetary assembly rotates at the same speed and in the same direction as said input rotation, said planetary assembly including first and second shafts supported for back and forth rotation about their own axes and positioned equidistant from and on opposite sides of the axis of said planetary assembly, whereby rotation of the planetary assembly in the direction and at the speed of said input rotation imparts to said first and second shafts an orbiting component of epicyclic motion about the axis of the planetary assembly in the same direction and at the speed of said input rotation;
(c) means supporting an index plate for rotation about its own stationary axis parallel with the axis of said planetary assembly;
(d) means for moving said index plate to a limited extent normal to its axis of rotation between a first stationary position concentric with said planetary assembly and a second stationary position eccentric to said planetary assembly to varying degrees; and
(e) means for coupling said index plate to said planetary assembly including said shafts so as to cause said index plate to rotate in the same direction and at the same speed as said planetary assembly and therefore at the same speed and in the same direction as said input rotation whether the index plate is concentric with or eccentric to said planetary assembly, whereby when the index plate is eccentric to the planetary assembly, it causes said first shaft to reciprocate about its own axis, first increasing then decreasing in speed in the same direction as its orbital component during a first half cycle of said orbital component and thereafter increasing and then decreasing in speed in the opposite direction during the second half-cycle of the orbital component and whereby it causes said second shaft to reciprocate in a like manner, except 180° out of phase with the reciprocating motion of said first shaft, said reciprocating motion of each shaft serving as a reciprocating component of its overall epicyclic motion.

45. An epicyclic motion generating arrangement, comprising:
(a) means for generating an input rotation;
(b) means supporting a planetary assembly including a given shaft for rotation about a radially inward, parallel central planetary axis, said shaft being supported for back and forth rotation about its own axis, said planetary assembly being coupled to said input rotation generating means so as to cause said planetary assembly to rotate in the direction and at the speed of said input rotation, whereby to impart to said shaft an orbiting component of epicyclic motion about said central planetary axis in the same direction as and at the same speed of said input rotation without regard to any back and forth rotation of the shaft about its own axis;
(c) means supporting an index plate for rotation about its own stationary axis parallel with but eccentric to said central planetary axis;
(d) means for coupling said index plate to said planetary assembly so as to cause the index plate to rotate at the same speed and in the same direction as the planetary assembly in response to said input rotation; and
(e) means for coupling said index plate to said shaft in a way which causes said shaft to rotate back and forth about its own axis as it orbits about said central planetary assembly and said index plate, whereby the back and forth rotation of said shaft serves as a reciprocating component of said epicyclic motion.

46. An arrangement according to claim 45 including means for supporting said index plate for movement between said stationary eccentric position, other eccentric positions, and a position concentric with said central planetary axis.

47. An apparatus for modifying an input rotation in continuously variable increments to produce a uniform rotational output, said apparatus comprising:
an input rotation shaft operatively connected to a power generating apparatus for rotation of said input shaft at an input rpm;
an planetary assembly operatively connected to said input rotation shaft for rotation of said planetary assembly about its own planetary axis at said input rpm;
a plurality of planetary offset shafts carried by and arranged radially and concentrically with respect to said planetary assembly, whereby to cause said offset shafts to orbit at said input rpm;
an index plate assembly including an index plate and means supporting said index plate for rotation as they orbit about its own stationary axis and for movement transverse to its own axis between one stationary position in which its axis is concentric with the planetary axis of said planetary assembly and other stationary positions in which its axis is eccentric to said planetary axis, said index plate being operatively connected to said planetary assembly and said input rotation shaft whereby to cause said index plate to rotate at said input rpm when the index plate is in one of its stationary positions;
means for coupling offset shafts to said index plate so as to cause the offset shafts to reciprocate in a predetermined way as they orbit when said index plate is rotating at said input rpm in one of its eccentric positions; and
a processing assembly for processing the orbiting and reciprocating motions of said offset shafts in a predetermined way to produce a modified rotational output.

48. An epicyclic motion generating arrangement, comprising:
(a) means for generating an input rotation at a certain speed and in a certain direction;
(b) means supporting a planetary assembly for rotation about its own axis in response to and synchronism with said input rotation, said planetary assembly including first and second shafts supported for back and forth rotation about their own axes and positioned equidistant from and on opposite sides of the axis of said planetary assembly, whereby rotation of the planetary assembly in the direction and at the speed of said input rotation imparts to said first and second shafts an orbiting component of epicyclic motion about the axis of the planetary assembly in the same direction and at the speed of said input rotation;

(c) means supporting an index plate for rotation about its own stationary axis parallel with the axis of said planetary assembly, said index plate including first and second slots positioned equidistant from and on opposite sides of the axis of the index plate;

(d) means for moving said index plate to a limited extent normal to its axis of rotation between a first stationary position concentric with said planetary assembly and a second stationary position eccentric to said planetary assembly to varying degrees;

(e) first and second crank means fixedly connected to common ends of said first and second shafts, respectively, and disposed within said first and second slots, respectively; and (f) means for coupling said index plate to said planetary assembly in a way which causes said index plate to rotate in the same direction and at the same speed as said planetary assembly whether the index plate is concentric with or eccentric to said planetary assembly, whereby, when the index plate is eccentric to the planetary assembly, it causes said first shaft to reciprocate about its own axis, first increasing then decreasing in speed in the same direction as its orbital component during a first half cycle of said orbital component and thereafter increasing and then decreasing in speed in the opposite direction during the second half-cycle of the orbital component and whereby it causes said second shaft to reciprocate in a like manner, except 180° out of phase with the reciprocating motion of each shaft serving as a reciprocating motion of each shaft serving as a reciprocating motion of each shaft serving as a reciprocating component of its overall epicyclic motion.

* * * * *